United States Patent
Naruse et al.

(10) Patent No.: US 10,594,909 B2
(45) Date of Patent: Mar. 17, 2020

(54) IMAGE PROCESSING DEVICE, IMAGE PROCESSING SYSTEM, AND IMAGE PROCESSING METHOD

(71) Applicant: FUJIFILM Corporation, Tokyo (JP)

(72) Inventors: Yousuke Naruse, Saitama (JP);
Takashi Kunugise, Saitama (JP);
Kenkichi Hayashi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 21 days.

(21) Appl. No.: 16/129,913

(22) Filed: Sep. 13, 2018

(65) Prior Publication Data

US 2019/0014244 A1 Jan. 10, 2019

Related U.S. Application Data

(63) Continuation of application No. PCT/JP2017/007874, filed on Feb. 28, 2017.

(30) Foreign Application Priority Data

Mar. 17, 2016 (JP) .................. 2016-054291

(51) Int. Cl.
*H04N 5/225* (2006.01)
*H04N 5/232* (2006.01)
(Continued)

(52) U.S. Cl.
CPC ........... *H04N 5/2254* (2013.01); *G03B 17/14* (2013.01); *G03B 43/00* (2013.01); *G06K 9/18* (2013.01);
(Continued)

(58) Field of Classification Search
CPC ............ H04N 5/2254; H04N 5/22541; H04N 5/23209; H04N 5/23229; G06K 9/18;
(Continued)

(56) References Cited

U.S. PATENT DOCUMENTS

| 6,191,406 B1* | 2/2001 | Nelson ............. G06K 9/00 250/208.1 |
| 10,218,911 B2* | 2/2019 | Shen ............. H04N 5/23293 348/333.05 |

(Continued)

FOREIGN PATENT DOCUMENTS

| CN | 103400131 A | 11/2013 |
| JP | 2005-354301 A | 12/2005 |

(Continued)

OTHER PUBLICATIONS

International Preliminary Report on Patentability and Written Opinion of the International Searching Authority (forms PCT/IB/373, PCT/ISA/237 and PCT/IB/326), dated Sep. 27, 2018, for corresponding International Application No. PCT/JP2017/007874, with Written Opinion translation.

(Continued)

Primary Examiner — Marly S Camargo
(74) Attorney, Agent, or Firm — Birch, Stewart, Kolasch & Birch, LLP

(57) ABSTRACT

An image processing device, an image processing system, and an image processing method capable of easily correcting image deterioration caused by nonuniform optical characteristics around an optical axis of a lens according to a position in a rotational direction of a lens barrel are provided. An image processing device includes a communication unit (42) that inputs a first image indicating a correction reference position in a rotation direction of a lens barrel (24) and a second image that is a correction target, the first image and the second image being obtained by imaging of the imaging device (10), a rotation position recognition unit (62) that recognizes the correction reference position in the rotational direction on the basis of the first image, a correction information acquisition unit (66) that acquires correction information on the basis of the correction reference (Continued)

position in the rotation direction, and an image correction unit (68) that corrects the second image on the basis of the correction information.

18 Claims, 29 Drawing Sheets

(51) Int. Cl.
    *G06T 5/00*     (2006.01)
    *G06K 9/18*     (2006.01)
    *G03B 17/14*     (2006.01)
    *G03B 43/00*     (2006.01)
    *G06K 9/32*     (2006.01)

(52) U.S. Cl.
    CPC ............ *G06K 9/3208* (2013.01); *G06T 5/001* (2013.01); *H04N 5/23209* (2013.01); *H04N 5/23229* (2013.01); *G06T 2207/30204* (2013.01)

(58) Field of Classification Search
    CPC .......... G06T 5/001; G06T 2207/30204; G03B 17/14; G03B 43/00
    USPC ......... 348/222.1, 208.13, 601; 382/254, 287, 382/175, 184, 266, 263, 274, 289, 296; 235/462.01–462.16
    See application file for complete search history.

(56) References Cited

U.S. PATENT DOCUMENTS

2016/0035108 A1*   2/2016   Yu ........................... G06T 7/20
                                                     382/131
2016/0156851 A1     6/2016   Yamada et al.

FOREIGN PATENT DOCUMENTS

| | | |
|---|---|---|
| JP | 2009-302697 A | 12/2009 |
| JP | 2010-87859 A | 4/2010 |
| JP | 2010-87893 A | 4/2010 |
| JP | 5646705 B1 | 12/2014 |

OTHER PUBLICATIONS

International Search Report (form PCT/ISA/210), dated Jun. 6, 2017, for corresponding International Application No. PCT/JP2017/007874, with an English translation.

Chinese Office Action and Search Report for counterpart Chinese Application No. 201780016871.4, dated Mar. 5, 2019, with partial English translation.

* cited by examiner

IMAGE PROCESSING DEVICE, IMAGE PROCESSING SYSTEM, AND IMAGE PROCESSING METHOD

CROSS-REFERENCE TO RELATED APPLICATIONS

The present application is a Continuation of PCT International Application No. PCT/JP2017/007874 filed on Feb. 28, 2017 claiming priority under 35 U.S.C. § 119(a) to Japanese Patent Application No. 2016-054291 filed on Mar. 17, 2016. Each of the above applications is hereby expressly incorporated by reference, in their entirety, into the present application.

BACKGROUND OF THE INVENTION

1. Field of the Invention

The present invention relates to an image processing device, an image processing system, and an image processing method in which correction corresponding to optical characteristics of a lens is performed on an image obtained by imaging of an imaging device.

2. Description of the Related Art

An image processing technology for correcting image deterioration caused by optical characteristics of a lens for an image obtained by imaging of an imaging device is known. For example, a point image restoration process is image processing in which characteristics of image deterioration due to lens aberration are obtained in advance, and the image deterioration of the image is canceled by a restoration filter according to the characteristics. Such image processing is effective for cost reduction of lenses and suppression of variations in image quality.

JP2009-302697A discloses two-dimensionally coding a correction parameter for distortion aberration of an imaging lens for each type of imaging lens, printing the two-dimensional code on a lens cap, and performing imaging and decoding of the two-dimensional code and correction of the distortion aberration for a captured image using a digital camera.

Further, JP2005-354301A discloses providing a signal transmission and reception circuit at a junction portion between a document table and a digital camera, measuring a rotation angle (slope angle) of a document using an angle sensor of the document table, transmitting the rotation angle to the digital camera, and writing rotation angle information to a tag portion of image data using the digital camera.

SUMMARY OF THE INVENTION

In a case where the lens barrel is detachably mounted on the imaging device, image processing according to the optical characteristics of the lens barrel is performed, and therefore, correction information corresponding to a type of the lens barrel may be required, and position information in the rotational direction of the lens barrel may be required. For example, in a lens barrel mounted in a screw mounting type, a mounting position in the rotational direction of the lens barrel is generally indefinite, and therefore, information indicating the mounting position in the rotation direction of the lens barrel becomes necessary in order to correct nonuniform optical characteristics around an optical axis of a lens. In addition, even in a case where the mounting position in the rotational direction is constant, information indicating a feeding stop position in the rotation direction of the lens barrel becomes necessary in a case where the lens barrel rotates in a feeding operation for focusing.

However, in a case where there is no electrical communication function at a connection portion (a mount unit) between the lens barrel and the imaging device, information necessary for correction cannot be transferred from the lens barrel to the imaging device. Further, even in a case where there is an electrical communication function at the connection portion between the lens barrel and the imaging device, information required for correction cannot be transferred from the lens barrel to the imaging device in a case where a common communication scheme is not used. That is, information necessary for correction cannot be transferred to the image processing device.

There is also a method in which a person inputs information necessary for correction, but an image processing device that performs correction is not always present near the lens barrel, and the image processing device may not be connected to a network. In such a situation, it is not realistic for a person to move directly to the vicinity of the image processing device and input information, which takes a lot of labor.

In JP2009-302697A, the two-dimensional code printed on the lens cap is information indicating a correction parameter determined for each type of imaging lens, is not information indicating a position in a rotational direction of the imaging lens (a mounting position or a feeding stop position), and is not information indicating a correction parameter that is changed depending on the position in the rotational direction of the imaging lens.

In JP2005-354301A, an electrical communication function is indispensable for the junction portion between the document table and the digital camera. Therefore, in a case where the lens barrel and the imaging device are not in communication, the technology of JP2005-354301A cannot be applied.

The present invention has been made in view of the above circumstances, and an object of the present invention is to provide an image processing device, an image processing system, and an image processing method capable of easily correcting image deterioration caused by nonuniform optical characteristics around an optical axis of a lens according to a position in a rotational direction of a lens barrel.

In order to achieve the above object, an image processing device according to a first aspect of the present invention comprises: an image input unit that inputs a first image indicating a correction reference position in a rotation direction of a lens barrel mounted on an imaging device and a second image that is a correction target, the first image and the second image being obtained by imaging of the imaging device; a rotation position recognition unit that recognizes the correction reference position in the rotational direction on the basis of the first image; a correction information acquisition unit that acquires correction information corresponding to nonuniform optical characteristics around an optical axis of a lens held in the lens barrel on the basis of the correction reference position in the rotation direction; and an image correction unit that corrects the second image on the basis of the correction information.

According to this aspect, it is possible to easily correct image deterioration caused by nonuniform optical characteristics around the optical axis of the lens according to the position in the rotational direction of the lens barrel.

In the image processing device according to a second aspect of the present invention, the first image includes a marker indicating the correction reference position, and the rotation position recognition unit measures a slope of the marker within a screen of the first image and recognizes the correction reference position on the basis of the slope.

In the image processing device according to a third aspect of the present invention, the marker is a one-dimensional or two-dimensional barcode. Here, the "barcode" refers to a coded pattern (a coding pattern), and may be simply referred to as a "code". The "two-dimensional barcode" includes a coding pattern called a "two-dimensional code".

In the image processing device according to a fourth aspect of the present invention, the barcode includes at least one of the correction information or the identification information, and the correction information acquisition unit acquires the correction information according to the correction reference position on the basis of a decoding result of the barcode and a slope of the barcode within the screen of the first image.

In the image processing device according to a fifth aspect of the present invention, the marker is a marker displayed on an image display device or a marker printed on an object.

In the image processing device according to a sixth aspect of the present invention, the first image includes correction reference position information acquired by the image display device, and the rotation position recognition unit recognizes the correction reference position by extracting the correction reference position information from the first image.

In the image processing device according to a seventh aspect of the present invention, the correction reference position information is posture information indicating a posture of the image display device detected by the image display device, and the correction information acquisition unit acquires the correction information on the basis of the posture information.

In the image processing device according to an eighth aspect of the present invention, the correction reference position information is user input information received by the image display device, and the correction information acquisition unit acquires the correction information on the basis of the user input information.

In the image processing device according to a ninth aspect of the present invention, the first image includes a light image due to light emission of a light source, and the rotation position recognition unit detects a light intensity distribution within the screen of the first image and recognizes the correction reference position on the basis of the light intensity distribution.

In the image processing device according to a tenth aspect of the present invention, the rotation position recognition unit recognizes the correction reference position on the basis of the position of the light image within the screen of the first image.

In the image processing device according to an eleventh aspect of the present invention, the light source is a point light source, and the rotation position recognition unit recognizes the correction reference position in the rotational direction on the basis of the position of the light image of the point light source in the first image.

In the image processing device according to a twelfth aspect of the present invention, the light intensity distribution is caused by a light intensity difference between a light transmission region and a light shielding region in the first image, and the rotation position recognition unit recognizes the correction reference position by detecting at least one of the light transmission region or the light-shielding region in the first image.

In the image processing device according to a thirteenth aspect of the present invention, the rotation position recognition unit recognizes the correction reference position in the rotational direction on the basis of a temporal change in a light intensity in the first image.

In the image processing device according to a fourteenth aspect of the present invention, the correction information acquisition unit acquires the correction information according to another correction reference position by converting correction information according to a single correction reference position.

In the image processing device according to a fifteenth aspect of the present invention, the correction information acquisition unit selects the correction information according to the correction reference position recognized by the rotation position recognition unit from a plurality of pieces of the correction information.

In the image processing device according to a sixteenth aspect of the present invention, the correction information includes correction information for a point image restoration process.

The image processing system according to a seventeenth aspect of the present invention comprises: a lens device including the lens and the lens barrel; the imaging device; and the image processing device.

The image processing method according to an eighteenth aspect of the present invention includes processes of: inputting a first image indicating a correction reference position in a rotation direction of a lens barrel mounted on an imaging device and a second image that is a correction target, the first image and the second image being obtained by imaging of the imaging device; recognizing the correction reference position in the rotational direction on the basis of the first image; acquiring correction information corresponding to nonuniform optical characteristics around an optical axis of a lens held in the lens barrel on the basis of the correction reference position in the rotation direction; and correcting the second image on the basis of the correction information. It should be noted that the "process" is also referred to as a "step" below.

According to the present invention, it is possible to easily correct image deterioration caused by nonuniform optical characteristics around the optical axis of the lens according to the position in the rotational direction of the lens barrel.

DESCRIPTION OF THE PREFERRED EMBODIMENTS

Hereinafter, an image processing device, an image processing system, and an image processing method according to the present invention will be described with reference to the accompanying drawings.

First Embodiment

Figure 1:
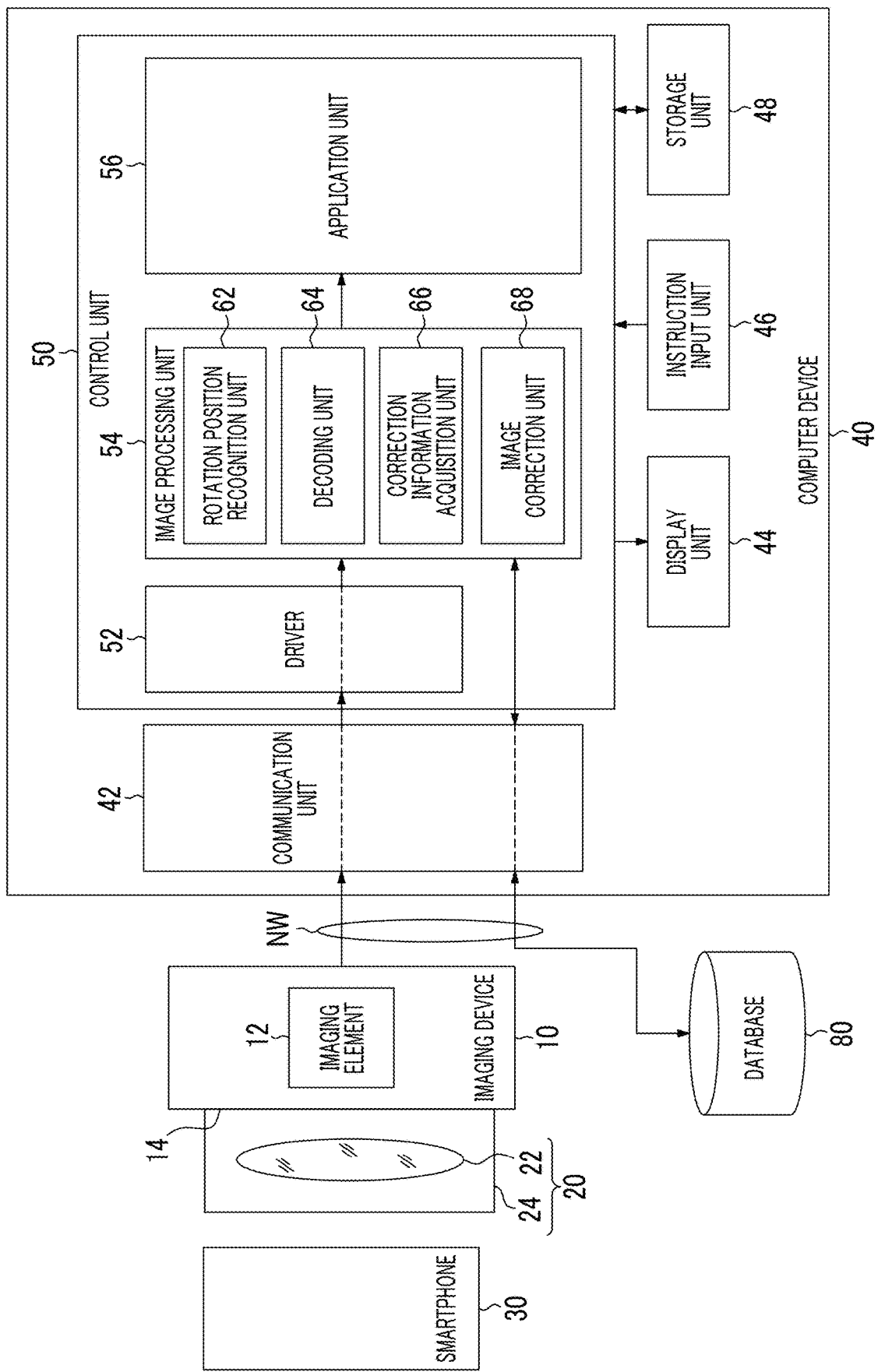
FIG. 1 is a block diagram illustrating a configuration example of an image processing system including an image processing device according to a first embodiment.

FIG. 1 is a block diagram illustrating a configuration example of an image processing system including an image processing device according to the first embodiment.

The image processing system of this example includes an imaging device 10, a lens device 20, a smartphone 30, a computer device 40 (which is an example of an image processing device), and a database 80.

The imaging device 10 includes an imaging element 12. The imaging device 10 of this example is a lens interchangeable type camera. For example, a complementary metal oxide semiconductor (CMOS) imaging sensor or a charge coupled device (CCD) imaging sensor is used as the imaging element 12. Other imaging devices may be used. The imaging device 10 is not limited to the lens interchangeable type camera. Any device may be used as long as the device has an imaging function and a lens device 20 to be described later can be mounted on the device.

The lens device 20 includes a lens 22, and a lens barrel 24 that holds the lens 22. The lens barrel 24 of this example can be mounted on and detached from the mount unit 14 of the imaging device 10. The lens barrel 24 is configured of, for example, a screw mounting type lens barrel 24 that is screwed into and mounted on the mount unit 14 of the imaging device 10. The screw mounting type lens barrel is mounted on, for example, a closed circuit television (CCTV) camera, a factory automation (FA) camera, and a machine vision (MV) camera. However, the lens barrel 24 may be screwed into and mounted on any imaging device 10. The lens barrel 24 may be mounted on the mount unit 14 of the imaging device 10 using another mounting scheme such as a bayonet type.

The smartphone 30 is an example of the "image display device" in the present invention. A configuration example of the smartphone 30 will be described later.

The computer device 40 is an example of the "image processing device" in the present invention. The computer device 40 of this example is a server device that performs image processing and application processing with the imaging device 10 as a client terminal. The computer device 40 is not limited to the server device. The computer device 40 may be a so-called personal computer.

The computer device 40 includes a communication unit 42 that performs output and input of information to and from an external device (in this example, the imaging device 10 and the database 80) over a network NW, a display unit 44 that performs a display, an instruction input unit 46 that receives an instruction input from a user, a storage unit 48 that stores various types of information, and a control unit 50 that controls each unit of the computer device 40 according to a program stored in the storage unit 48.

The communication unit 42 includes a wired or wireless communication device. The communication unit 42 is an example of an "image input unit".

The display unit 44 is a display device capable of displaying an image, and includes, for example, a liquid crystal display (LCD). Another display device such as an organic electroluminescence display may be used.

The instruction input unit 46 includes, for example, a keyboard and a pointing device (for example, a mouse). The instruction input unit 46 may be configured of a touch panel. Another input devices such as a voice input device or a gesture input device may be used.

The storage unit 48 includes, for example, a read only memory (ROM), a random access memory (RAM), and an electrically erasable programmable read only memory (EEPROM). Other storage devices may be used.

The control unit 50 includes, for example, a central processing unit (CPU).

The control unit 50 includes a driver 52 that performs input/output control to and from the imaging device 10 by controlling the communication unit 42, an image processing unit 54 that performs image processing on an image (hereinafter referred to as "captured image") obtained by imaging of the imaging device 10, and an application unit 56 that performs application processing using the captured image (hereinafter referred to as "application image") subjected to image processing.

The image processing unit 54 includes a rotation position recognition unit 62 that recognizes a correction reference position in a rotational direction of the lens barrel 24 on the basis of a slope of the two-dimensional code (also referred to as "two-dimensional barcode") within a screen of a first captured image (also referred to as a "first image"), a decoding unit 64 that decodes the two-dimensional code in the first captured image, a correction information acquisition unit 66 that acquires correction information corresponding to nonuniform optical characteristics around an optical axis of the lens 22 held in the lens barrel 24 on the basis of a decoding result of the two-dimensional code and a correction reference position in the rotation direction of the lens barrel 24, and an image correction unit 68 that corrects a second captured image (also referred to as a "second image") on the basis of the correction information.

The "correction information" is, for example, correction information for a point image restoration process (also referred to as an "image restoration process"). The "correction information" may be any one or a combination of correction information for distortion aberration correction, correction information for shading correction (ambient light intensity correction), and correction information for color correction.

Instead of the two-dimensional code, a one-dimensional code (also referred to as a "one-dimensional barcode") may be used.

The "slope" of the two-dimensional code or one-dimensional code is a slope within the screen of the first image, not a collapse in an optical axis direction.

Figure 2:
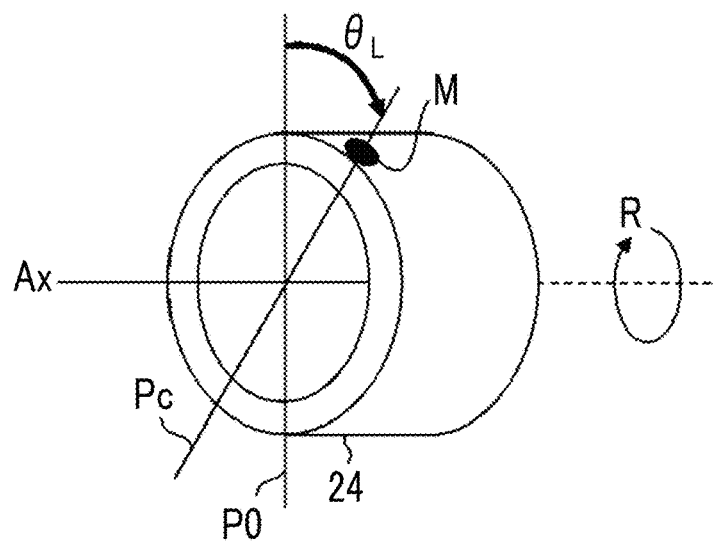
FIG. 2 is an illustrative diagram that is used to illustrate a correction reference position of a lens barrel.

FIG. 2 is an illustrative diagram that is used for description of the correction reference position of the lens barrel. A specific mark M is attached to the lens barrel 24 so that a mounting position (which is an example of the correction reference position) in the rotation direction R of the lens barrel 24 can be discriminated. The mark M may be attached to the lens barrel 24 using any method such as printing, sticking, or attaching, as long as the mark can be recognized using the method.

The lens barrel 24 of this example is screwed into and mounted on the mount unit 14 of the imaging device 10. That is, the lens barrel 24 of this example is a screw mounting type. Further, the lens barrel 24 of this example cannot communicate with the imaging device 10. Cases where the lens barrel 24 cannot communicate with the imaging device 10 include the following cases. First, there are a case where means with which the lens barrel 24 communicates with the imaging device 10 is not mounted. Second, there is a case where means with which the imaging device 10 communicates with the lens barrel 24 is not mounted. Third, there is a case where, even in a case where both the lens barrel 24 and the imaging device 10 include communication means mounted thereon, there is no common communication scheme. Fourth, even in a case where the lens barrel 24 and the imaging device 10 have a common communication scheme, the lens barrel 24 and the imaging device 10 may be substantially unable to communicate with each other since the driver 52 of the computer device 40 does not have a function of using communication content between the lens barrel 24 and the imaging device 10.

In a case where the lens barrel 24 is screwed into and mounted on the mount unit 14 of the imaging device 10, a mounting position (which is a correction reference position Pc) of the lens barrel 24 in the rotation direction R around an optical axis Ax of the lens barrel 24 is indefinite. In the rotation direction R of the lens barrel 24 in FIG. 2, the correction reference position Pc is a position rotated by an angle $\theta_L$ from an inspection reference position P0 (which is a reference position in a case where the optical characteristics of the lens 22 held in the lens barrel 24 are inspected). Thus, in a case where the correction reference position Pc is indefinite and the lens barrel 24 and the imaging device 10 cannot communicate with each other, the computer device 40 cannot acquire the correction reference position Pc from the imaging device 10. Therefore, the rotation position recognition unit 62 of the computer device 40 recognizes the correction reference position Pc through an image on the basis of the first captured image (a first image).

Figure 3:
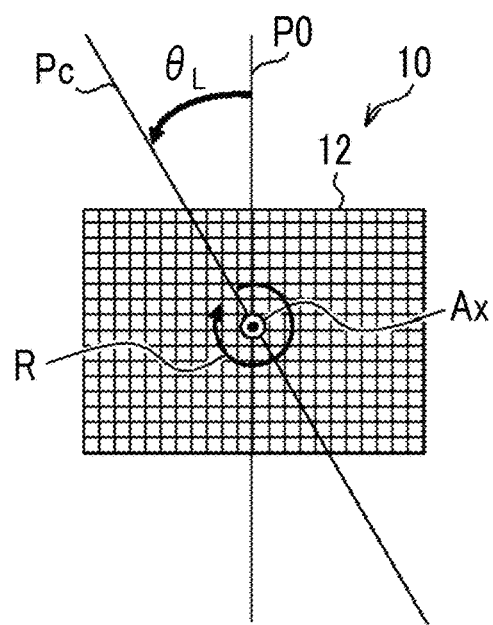
FIG. 3 is an illustrative diagram that is used to illustrate a relationship between a correction reference position of a lens barrel and an imaging surface of an imaging element.

When the inspection reference position P0 is shifted from the correction reference position Pc by an angle $\theta_L$ in the lens barrel 24 as illustrated in FIG. 2, the inspection reference position P0 is shifted from the correction reference position Pc by an angle $\theta_L$ on an imaging surface of the imaging element 12 as illustrated in FIG. 3.

Therefore, the correction information acquisition unit 66 of the computer device 40 performs offset conversion to convert single correction information corresponding to the inspection reference position P0 by the angle $\theta_L$ in the rotation direction R. Accordingly, it is possible to obtain appropriate correction information corresponding to an actual correction reference position Pc (which is "another correction reference position" in the present invention).

Alternatively, the correction information acquisition unit 66 generates a plurality of pieces of correction information corresponding to a plurality of angles $\theta_L i$ (i=1 to N) on the basis of the correction information corresponding to the inspection reference position P0 in advance and stores the correction information in the database 80 (or the storage unit 48). The correction information acquisition unit 66 selects correction information corresponding to the actual correction reference position Pc from the plurality of pieces of correction information. Thus, appropriate correction information corresponding to the actual correction reference position Pc can be obtained.

Although the case where the lens barrel 24 is a screw mounting type has been described by way of example, the inspection reference position P0 may be shifted from the correction reference position Pc even in a case where other mounting types may be used. For example, even in a case where a bayonet mounting type is used, a feeding position (which is another example of the correction reference position Pc) of the lens barrel 24 in the rotation direction R around the optical axis Ax is indefinite in a case where the lens barrel 24 is of a type that performs a feeding rotation for focusing.

Figure 4:
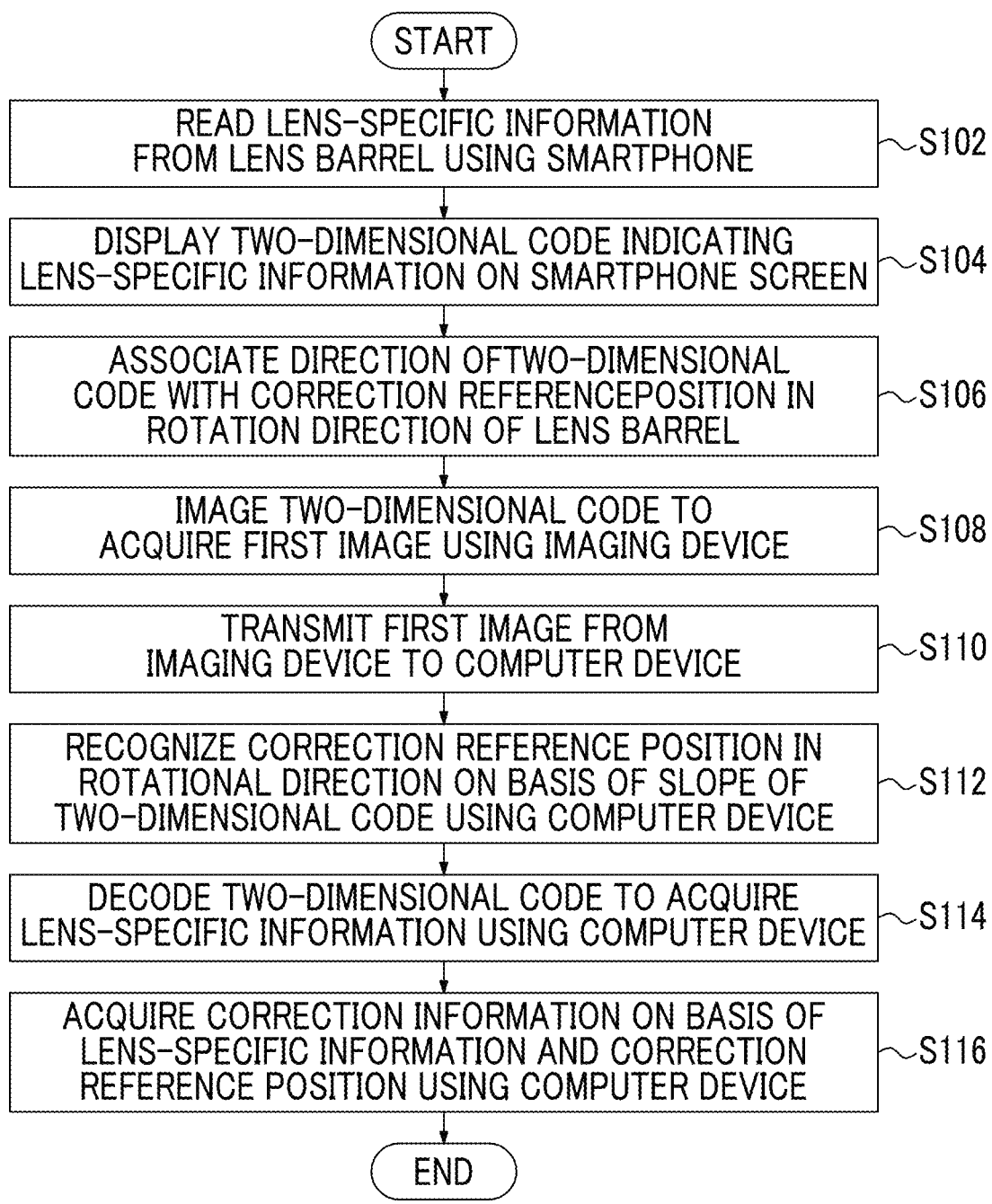
FIG. 4 is a first flowchart showing a flow of an image processing example according to the first embodiment.
Figure 5:
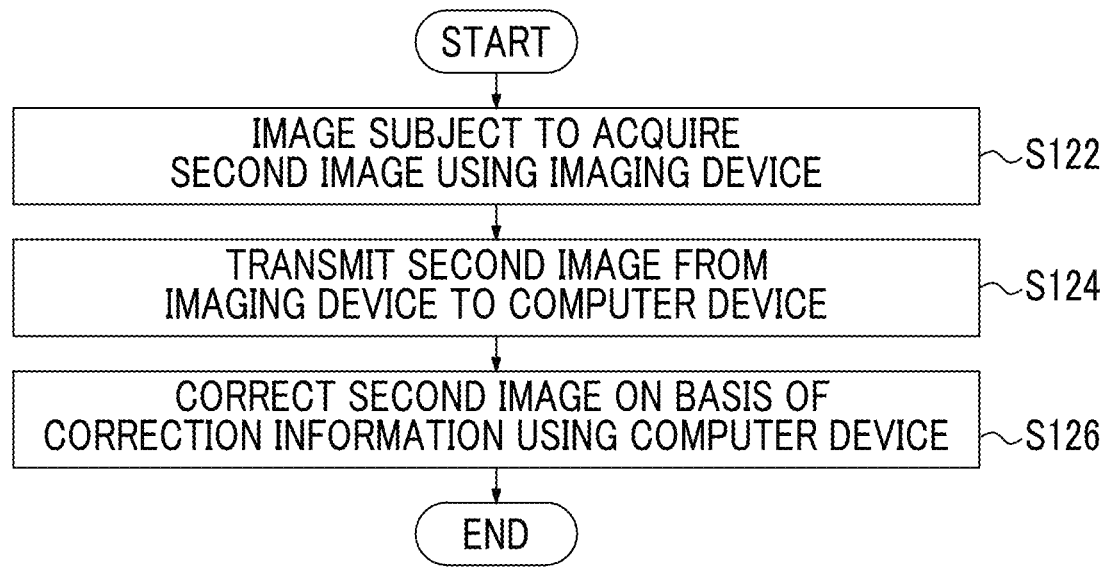
FIG. 5 is a second flowchart showing a flow of an image processing example in the first embodiment.

FIGS. 4 and 5 are flowcharts showing a flow of the image processing example in the first embodiment.

In FIG. 4, lens-specific information is first read from the lens barrel 24 by the smartphone 30 (step S102). The lens-specific information is, for example, identification information of the lens barrel 24 (or the lens device 20) or identification information of correction information at the time of inspection. The lens-specific information may be correction information (correction information at the time of inspection) corresponding to the inspection reference position P0. The lens-specific information may be, for example, a numerical value string indicating specific image deterioration characteristics or an identification (ID) number indicating a specific image deterioration pattern.

Then, the lens-specific information is coded by the smartphone 30 and the two-dimensional code is displayed (step S104). The two-dimensional code is, for example, a QR code (registered trademark) (QR is derived from "quick response").

Then, a direction of the two-dimensional code displayed on the smartphone 30 is associated with the correction reference position in the rotation direction of the lens barrel 24 (step S106). Since the mark M is attached to the lens barrel 24 as illustrated in FIG. 2, it is possible to associate the direction of the two-dimensional code displayed on the smartphone 30 with the correction reference position Pc by associating the direction of the casing of the smartphone 30 with the position of the mark M, for example, by hand.

Figure 6:
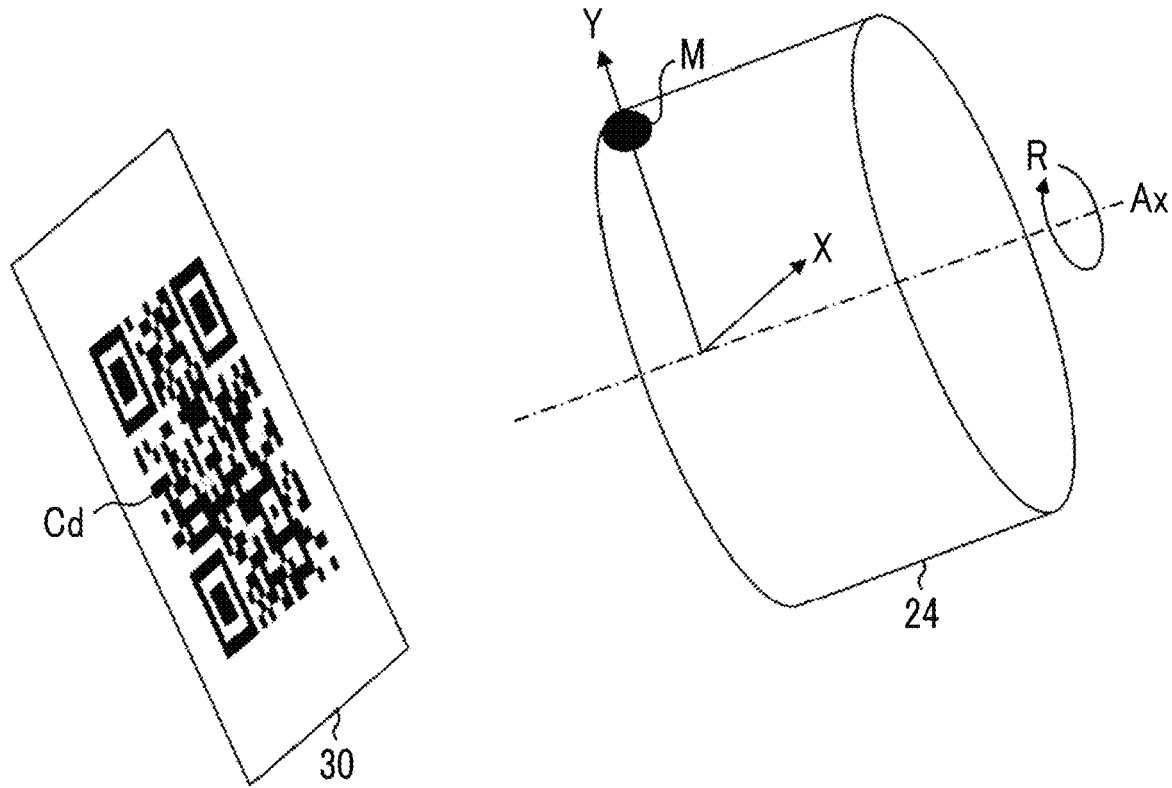
FIG. 6 is an illustrative diagram that is used to illustrate an example in which a direction of a two-dimensional code is associated with a correction reference position in the first embodiment.

As illustrated in FIG. 6, in a case where there is the mark M at an upward position of the lens barrel 24 (which is a position on a Y-axis in FIG. 6), the two-dimensional code Cd is disposed in the upward direction of the lens barrel 24 (which is a Y-axis direction in FIG. 6). That is, an upper end of the screen of the smartphone 30 is directed in an upward direction Y.

Figure 7:
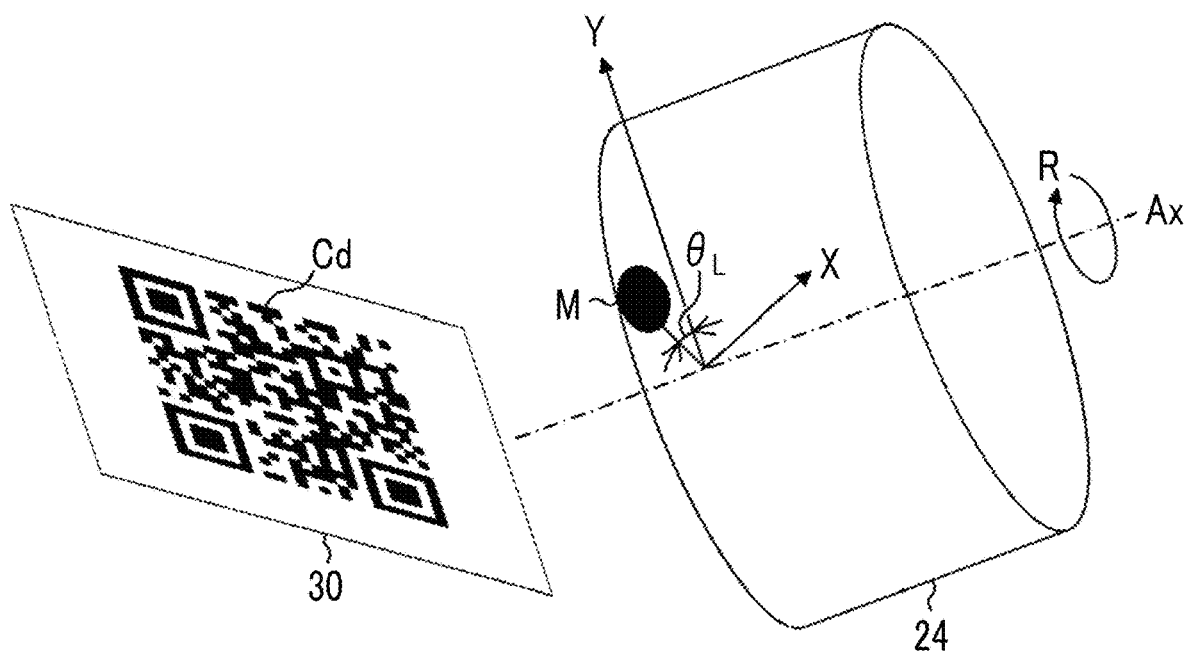
FIG. 7 is an illustrative diagram that is used to illustrate another example in which a direction of a two-dimensional code is associated with a correction reference position in the first embodiment.

As illustrated in FIG. 7, in a case where there is a mark M at a position inclined by an angle $\theta_L$ from an upward position (which is a position on a Y-axis in FIG. 7) of the lens barrel 24, the two-dimensional code Cd is disposed to be inclined by substantially the angle $\theta_L$ with respect to an upward direction (which is the Y-axis direction in FIG. 7) of the lens barrel 24. That is, the upper end of the screen of the smartphone 30 is inclined by substantially the angle $\theta_L$ with respect to the upward direction Y. However, a slope of the two-dimensional code Cd need not be perfectly coincident with the position in the rotation direction R of the mark M. For example, which of a plurality of angles (0 degrees, 45 degrees, 90 degrees, . . . , 315 degrees) at 45-degree intervals to which the angle $\theta_L$ of the mark M is closest is indicated by the slope of the two-dimensional code Cd.

Figure 8:
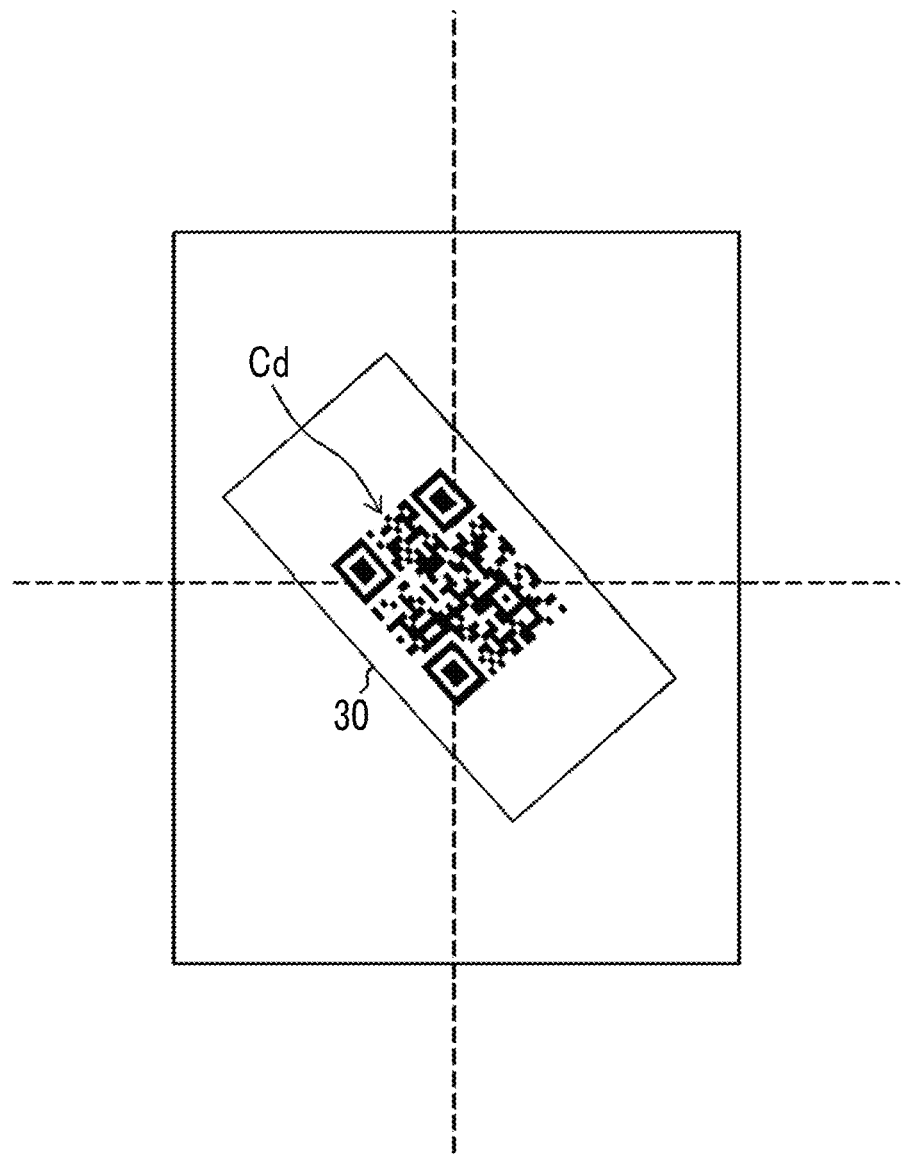
FIG. 8 is an illustrative diagram that is used to illustrate an example of a first image showing a correction reference position in the first embodiment.

Then, the imaging device 10 acquires the first image including the two-dimensional code (step S108). For example, the first image illustrated in FIG. 8 is acquired.

Then, the first image including the two-dimensional code is transmitted from the imaging device 10 to the computer device 40 (step S110). The first image is input by the communication unit 42 of the computer device 40.

Then, the rotation position recognition unit 62 of the computer device 40 recognizes the correction reference position in the rotational direction of the lens barrel 24 on the basis of the slope of the two-dimensional code within the screen of the first image (step S112).

Then, the decoding unit 64 of the computer device 40 decodes the two-dimensional code to acquire the lens-specific information (step S114).

Then, the correction information acquisition unit 66 of the computer device 40 acquires the correction information from the database 80 on the basis of the lens-specific information and the correction reference position in the rotation direction of the lens barrel 24 (step S116).

Moving from FIG. 4 (showing steps S102 to S116) to FIG. 5 (showing steps S122 to S126), the imaging device 10 then images a target subject to acquire the second image including a subject image (step S122). The second image is an image that is a correction target.

Then, the imaging device 10 transmits the second image that is a correction target including the subject image to the computer device 40 (step S124). The second image is input by the communication unit 42 of the computer device 40.

Then, the image correction unit 68 of the computer device 40 corrects the second image on the basis of the correction information (step S126).

Figure 9:
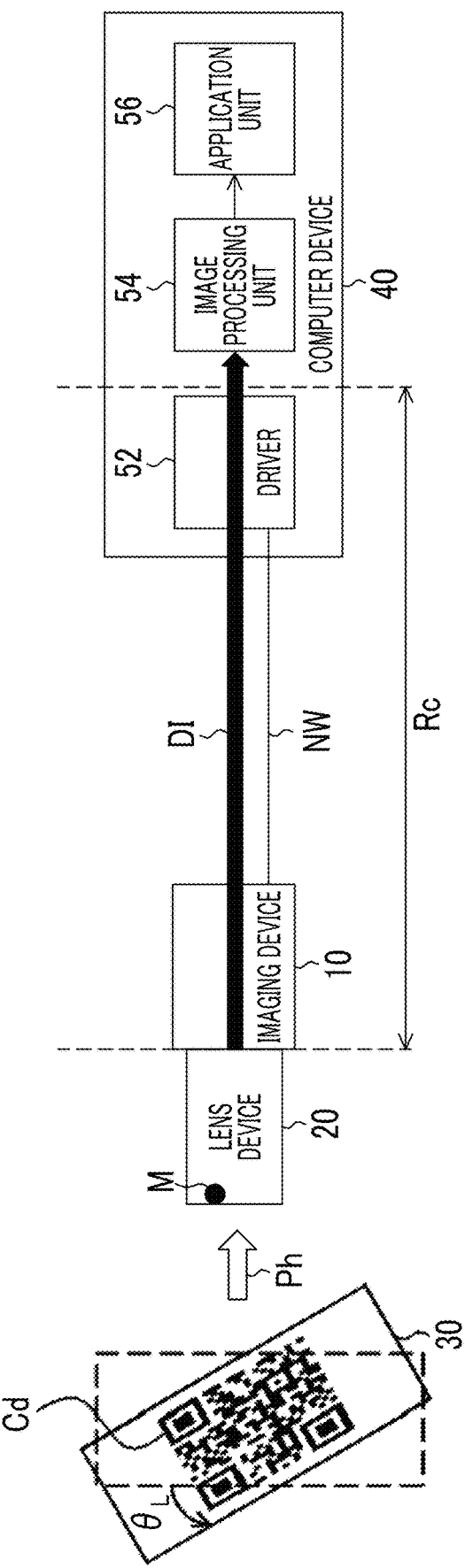
FIG. 9 is an illustrative diagram that is used to illustrate effects in the first embodiment.

As illustrated in FIG. 9, in the embodiment, the two-dimensional code Cd obtained by coding the lens-specific information of the lens device 20, which is the two-dimensional code Cd indicating the correction reference position of the lens barrel 24 using the slope on the screen is displayed on the smartphone 30. A first image DI including the two-dimensional code Cd is acquired by normal imaging Ph of the imaging device 10 and delivered to the image processing unit 54 of the computer device 40 by normal processing of the driver 52 of the computer device 40. Then, the image processing unit 54 of the computer device 40 acquires the lens-specific information from a decoding result of the two-dimensional code Cd in the first image DI and recognizes the correction reference position from the slope on the screen of the two-dimensional code Cd. Thus, it is not necessary for new hardware and new software for transmitting the lens-specific information and the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

Although the case where the barcode (which is one form of marker) is a barcode displayed on the smartphone 30 (which is one form of image display device) has been described above, a barcode printed on an object may be imaged by the imaging device 10. That is, the "marker" that is an imaging target in the present invention is not limited to the marker displayed on the image display device, but may be a marker printed on an object (for example, a box).

Second Embodiment

Figure 10:
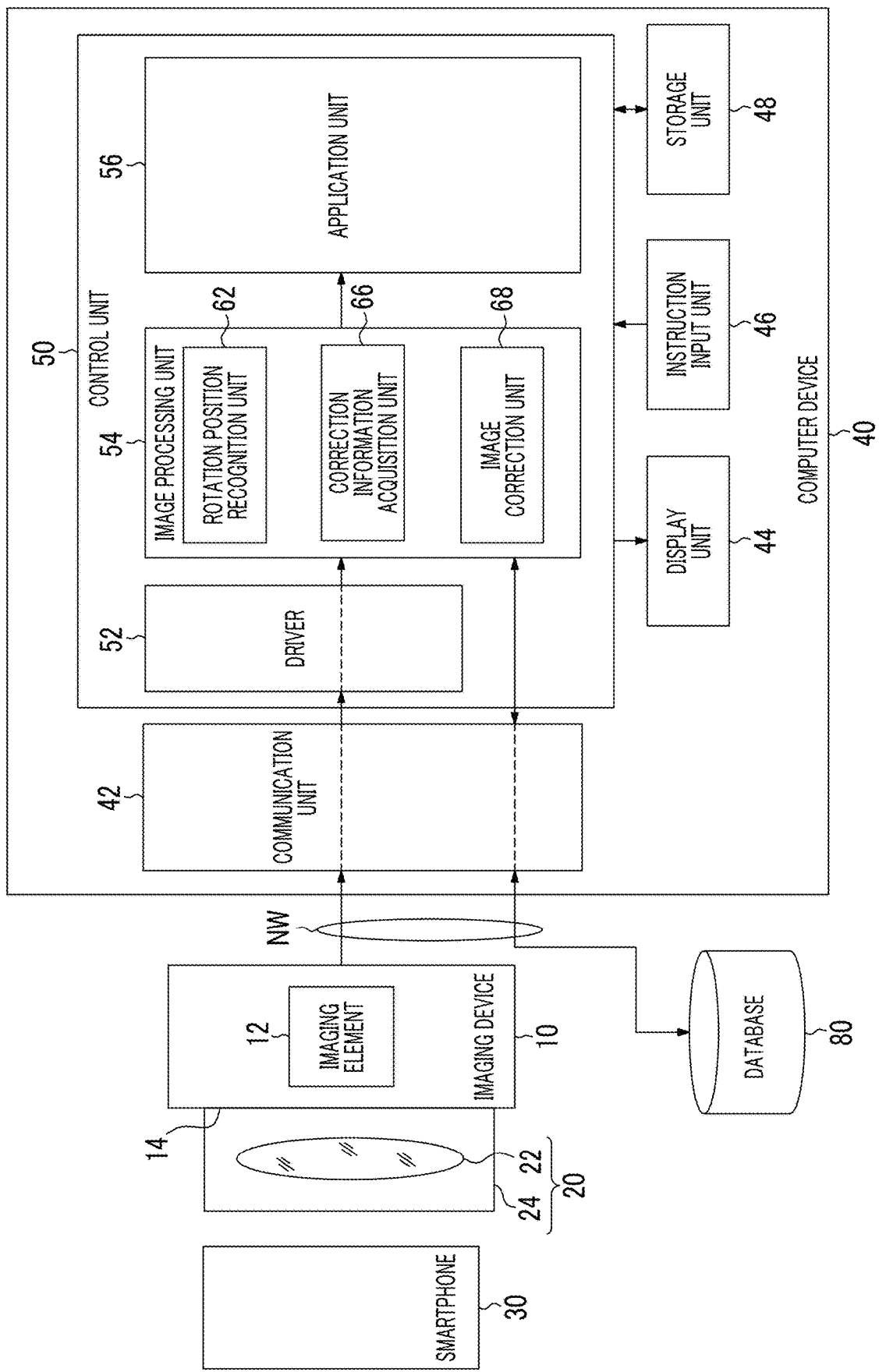
FIG. 10 is a block diagram illustrating a configuration example of an image processing system including an image processing device according to a second embodiment.

FIG. 10 is a block diagram illustrating a configuration example of an image processing system including the image processing device according to a second embodiment. In FIG. 10, the same components as those of the image processing device in the first embodiment illustrated in FIG. 1 are denoted with the same reference numerals, and content that has already described are hereinafter omitted.

Figure 11:
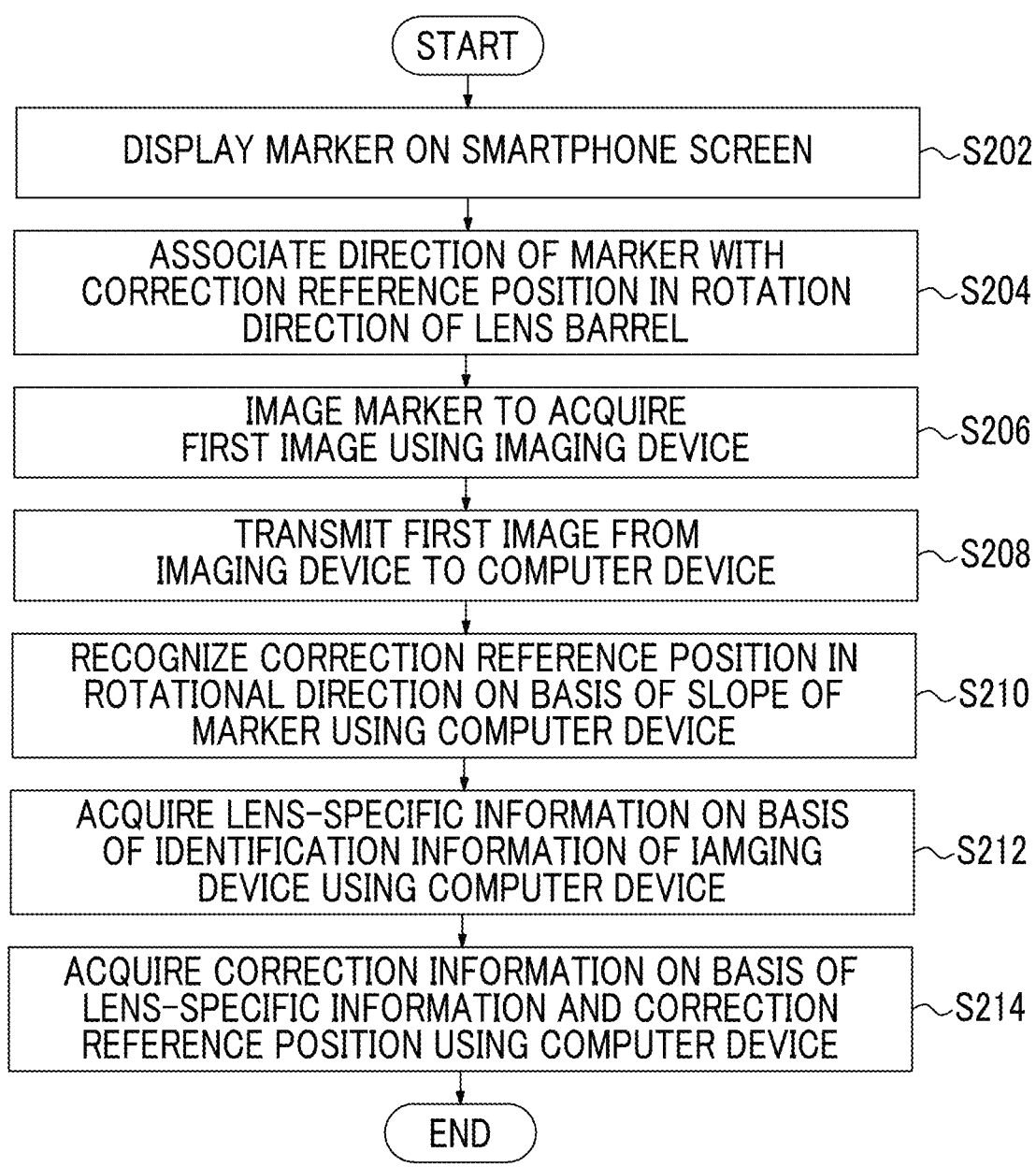
FIG. 11 is a flowchart showing a flow of an image processing example according to the second embodiment.

FIG. 11 is a flowchart showing a flow of an image processing example according to the second embodiment.

Figure 12:
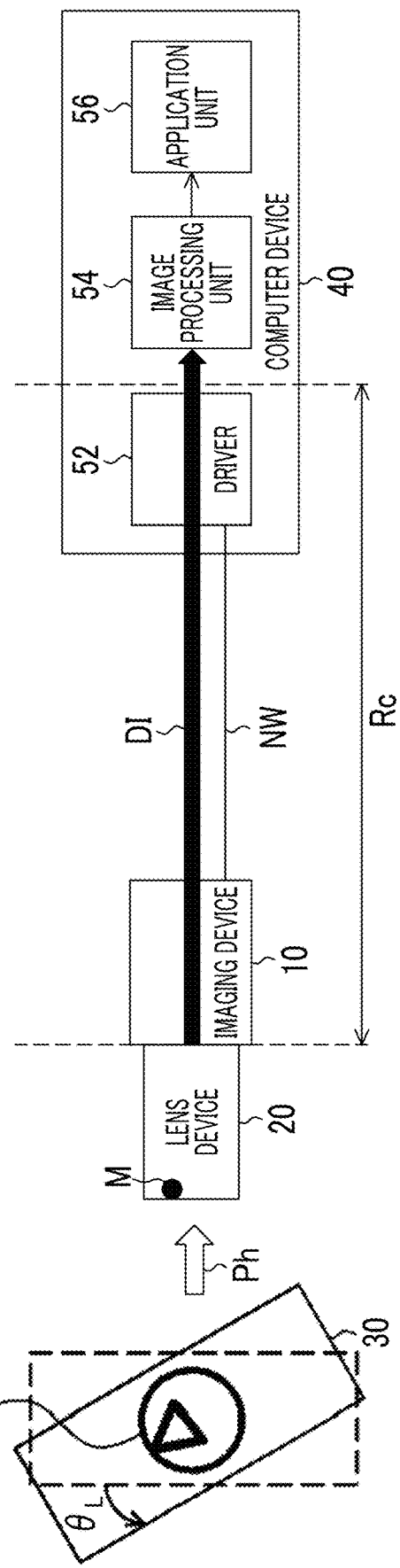
FIG. 12 is an illustrative diagram that is used to illustrate effects in the second embodiment.

First, as illustrated in FIG. 12, a marker MP (marker pattern) is displayed by the smartphone 30 (step S202), and a direction of the marker MP is associated with the correction reference position in the rotation direction of the lens barrel 24 (step S204). Since the mark M is attached to the lens barrel 24 as illustrated in FIG. 2, it is possible to associate the direction of the two the marker MP displayed on the smartphone 30 with the correction reference position Pc by associating the direction of the casing of the smartphone 30 with the position of the mark M, for example, by hand.

Then, the imaging device 10 images the displayed marker MP and acquires a first image including the marker MP (step S206).

Then, the first image including the marker MP is transmitted from the imaging device 10 to the computer device 40 (step S208). The first image is input by the communication unit 42 of the computer device 40.

Then, the rotation position recognition unit 62 of the computer device 40 recognizes the correction reference position in the rotation direction of the lens barrel 24 on the basis of the slope of the marker MP within the screen of the first image (step S210).

Then, the correction information acquisition unit 66 of the computer device 40 acquires the lens-specific information of the lens device 20 on the basis of the identification information of the imaging device 10 (step S212). Any type of information may be used as the identification information of the imaging device 10 as long as the imaging device 10 can be identified from the information. A communication address of the imaging device 10 may be used. Further, it is assumed that the identification information of the imaging device 10 and the lens-specific information of the lens device 20 are associated with each other in the database 80. The correction information acquisition unit 66 can acquire the lens-specific information on the basis of the identification information of the imaging device 10 by referring to the database 80.

Then, the correction information acquisition unit 66 of the computer device 40 acquires the correction information from the database 80 on the basis of the lens-specific information and the correction reference position in the rotation direction of the lens barrel 24 (step S214).

As illustrated in FIG. 12, in the embodiment, the marker MP (marker pattern) indicating the correction reference position of the lens barrel 24 using the slope on the screen is displayed on the smartphone 30. The first image DI including the marker MP is acquired by the normal imaging Ph of the imaging device 10 and delivered to the image processing unit 54 of the computer device 40 by normal processing of the driver 52 of the computer device 40. The image processing unit 54 of the computer device 40 recognizes the correction reference position from the slope on the screen of the marker MP in the first image DI. Thus, it is not necessary for new hardware and new software for transmitting the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

Third Embodiment

Figure 13:
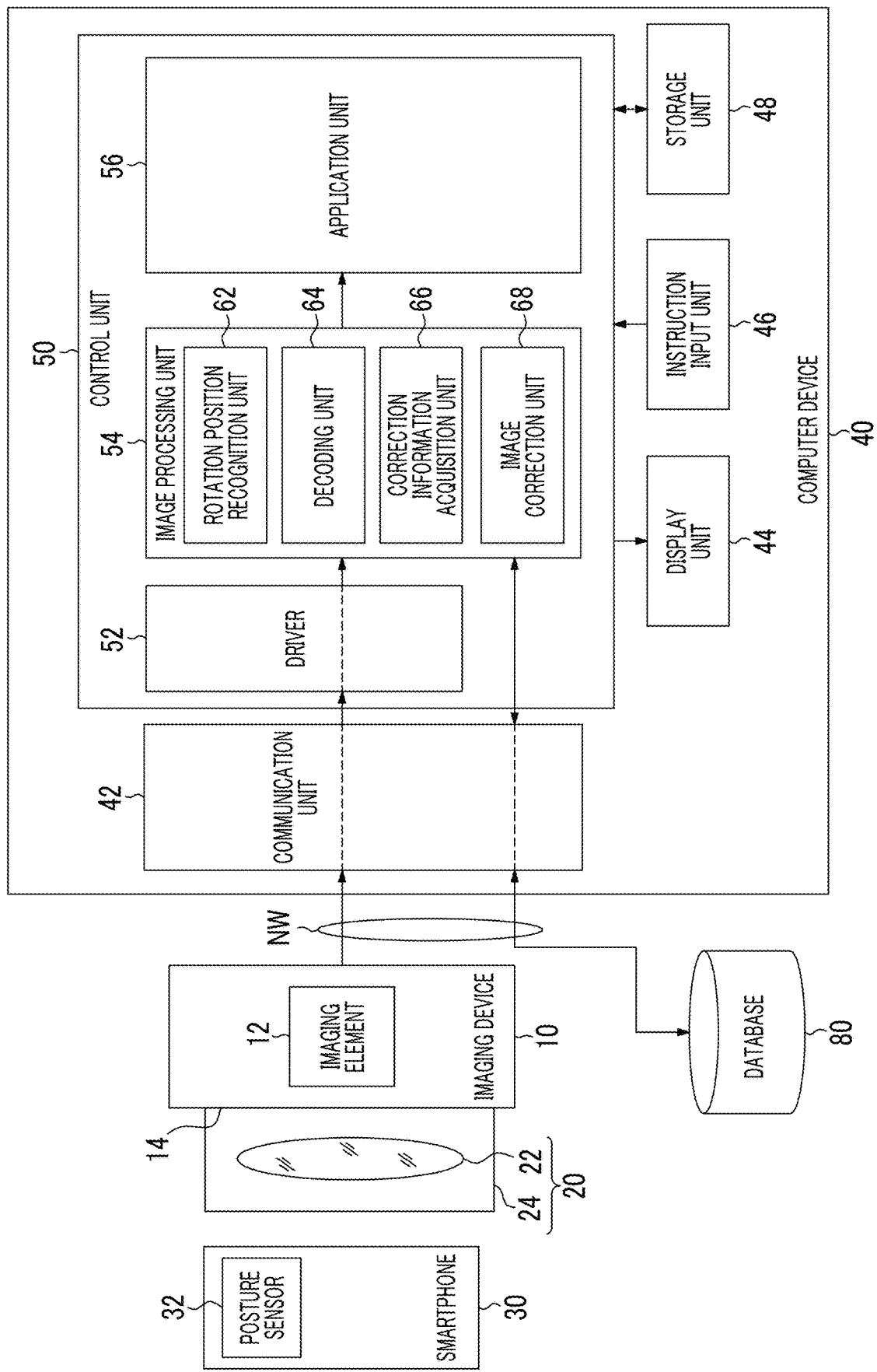
FIG. 13 is a block diagram illustrating a configuration example of an image processing system including an image processing device according to a third embodiment.

FIG. 13 is a block diagram illustrating a configuration example of an image processing system including an image processing device according to a third embodiment. In FIG. 13, the same components as those of the image processing device in the first embodiment illustrated in FIG. 1 are denoted with the same reference numerals, and content that has already described are hereinafter omitted.

A smartphone 30 includes a posture sensor 32 that detects a posture of the smartphone 30. The posture sensor 32 includes, for example, a gyro sensor. In the embodiment, the correction reference position information is information indicating the posture of the smartphone 30 detected by the posture sensor 32, and the correction information acquisition unit 66 extracts information indicating the posture of the smartphone 30 from the first image (which is correction reference position information) and acquires the correction information on the basis of the information indicating the posture of the smartphone 30.

Figure 14:
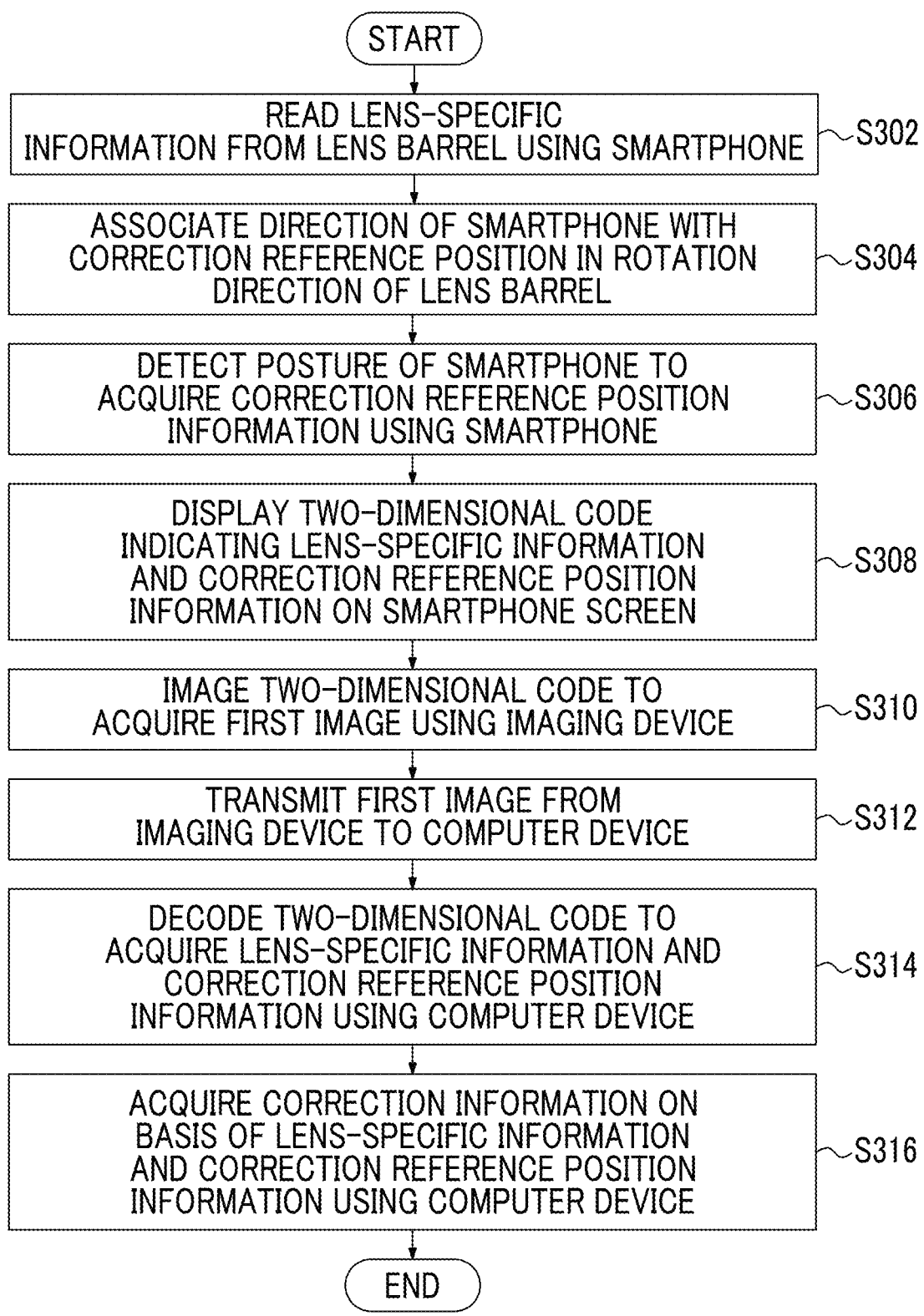
FIG. 14 is a flowchart showing a flow of an image processing example according to the third embodiment.

FIG. 14 is a flowchart showing a flow of an image processing example according to the third embodiment.

First, the lens-specific information is read from the lens barrel 24 by the smartphone 30 (step S302). Step S302 is the same as step S102 of the first embodiment.

Then, the direction of the smartphone 30 is associated with the correction reference position in the rotation direction of the lens barrel 24 (step S304). As illustrated in FIG. 2, since the mark M is attached to the lens barrel 24, for example, a direction of a casing of the smartphone 30 is associated with the position of the mark M with the hand.

Then, the posture of the smartphone 30 is detected by the posture sensor 32 of the smartphone 30 and correction reference position information is acquired (step S306).

Then, the lens-specific information and the correction reference position information are coded by the smartphone 30 and the two-dimensional code is displayed (step S308).

Then, the two-dimensional code is imaged by the imaging device 10, and a first image including the two-dimensional code is acquired (step S310).

Then, the first image including the two-dimensional code is transmitted from the imaging device 10 to the computer device 40 (step S312). The first image is input by the communication unit 42 of the computer device 40.

Then, the decoding unit 64 of the computer device 40 decodes the two-dimensional code to acquire the lens-specific information and the correction reference position information (step S314).

Then, the correction information acquisition unit 66 of the computer device 40 acquires the correction information from the database 80 on the basis of the lens-specific information and the correction reference position in the rotation direction of the lens barrel 24 (step S316). That is, the correction information acquisition unit 66 of this example acquires the correction information on the basis of the posture information detected by the posture sensor 32 of the smartphone 30.

Figure 15:
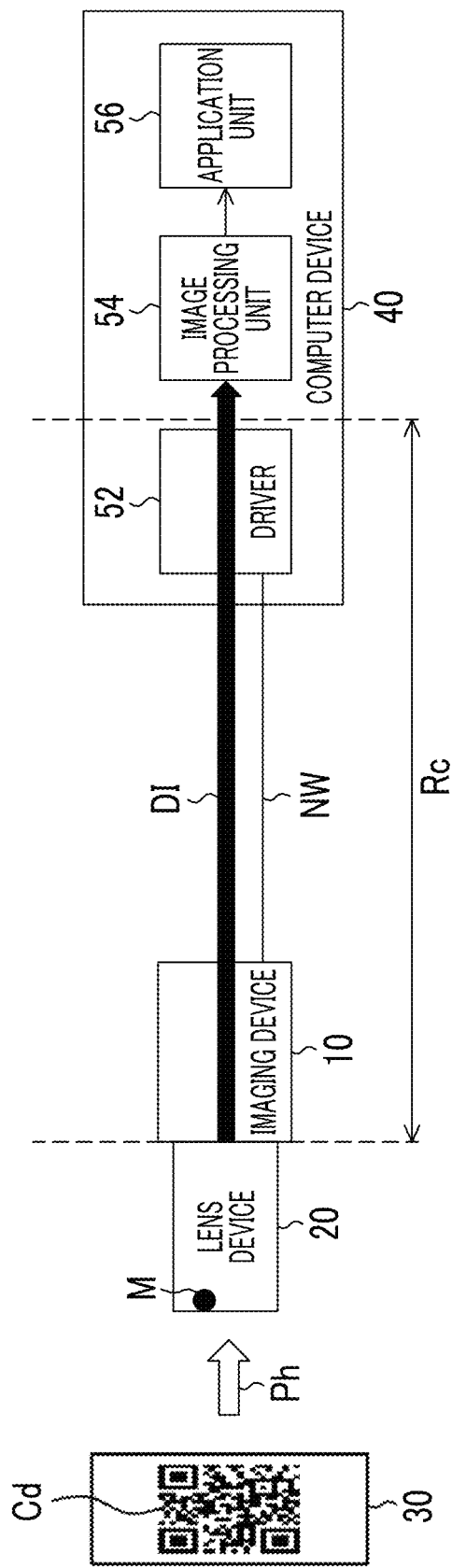
FIG. 15 is an illustrative diagram that is used to illustrate effects in the third embodiment.

In the embodiment, the correction reference position is acquired by the posture sensor 32 of the smartphone 30, and as illustrated in FIG. 15, the two-dimensional code Cd obtained by coding the lens-specific information of the lens barrel 24 and the correction reference position is displayed on the smartphone 30. The first image DI including the two-dimensional code Cd is acquired by the normal imaging Ph of the imaging device 10 and delivered to the image processing unit 54 of the computer device 40 by normal processing of the driver 52 of the computer device 40. Then, the image processing unit 54 of the computer device 40 acquires the lens-specific information and the correction reference position from a decoding result of the two-dimensional code Cd in the first image DI. Thus, it is not necessary for new hardware and new software for transmitting the lens-specific information and the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

Fourth Embodiment

Figure 16:
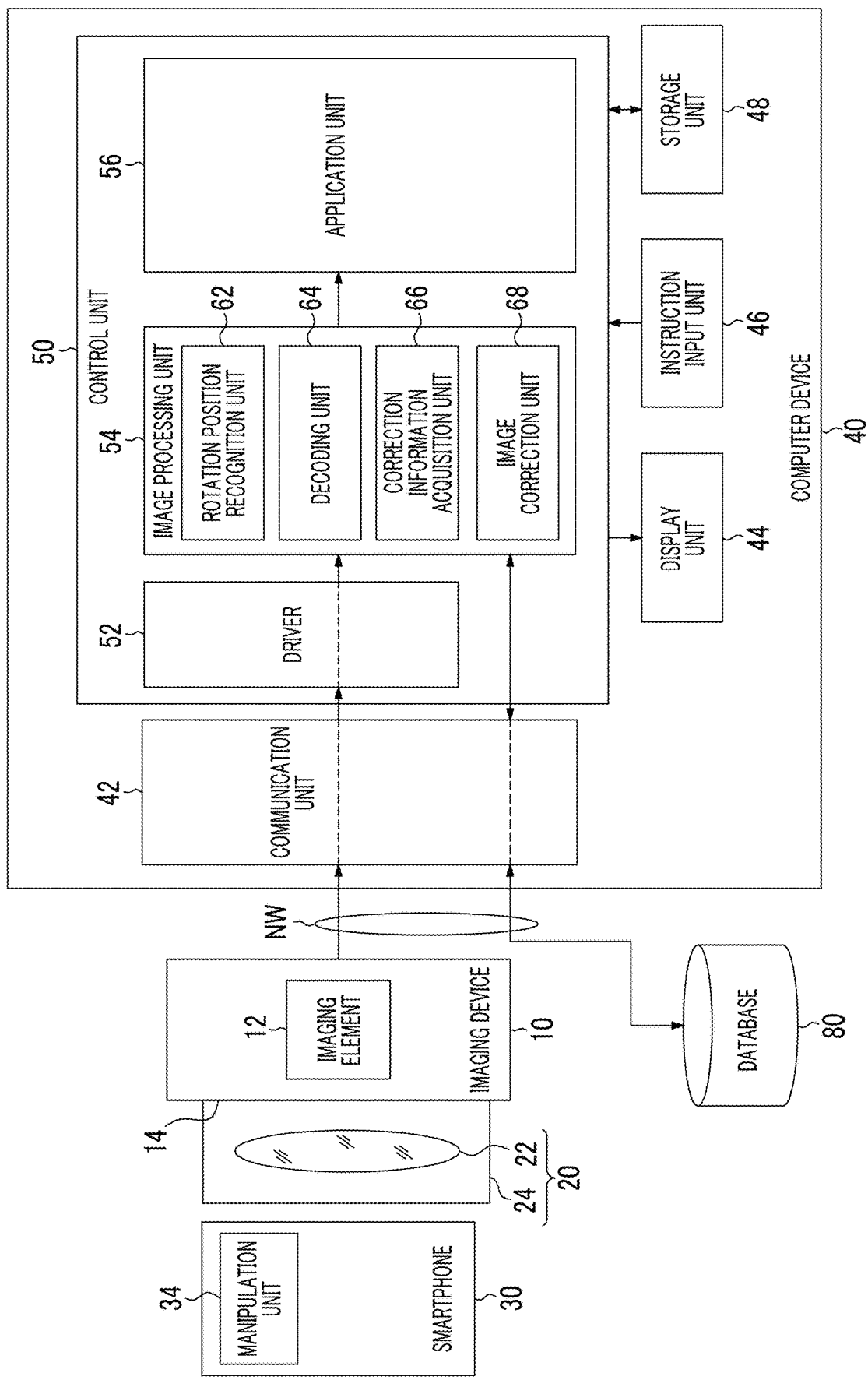
FIG. 16 is a block diagram illustrating a configuration example of an image processing system including an image processing device according to a fourth embodiment.

FIG. 16 is a block diagram illustrating a configuration example of an image processing system including an image processing device according to a fourth embodiment. In FIG. 16, the same components as those of the image processing device in the first embodiment illustrated in FIG. 1 are denoted with the same reference numerals, and content that has already described are hereinafter omitted.

The smartphone 30 includes a manipulation unit 34 that receives an instruction input from the user. The manipulation unit 34 includes a touch panel, for example. An input of the correction reference position information is received by the manipulation unit 34. In the embodiment, the correction reference position information is user input information received by the smartphone 30, and the correction information acquisition unit 66 extracts user input information (which is correction reference position information) in the smartphone 30 from the first image, and acquires the correction information on the basis of the user input information in the smartphone 30.

Figure 17:
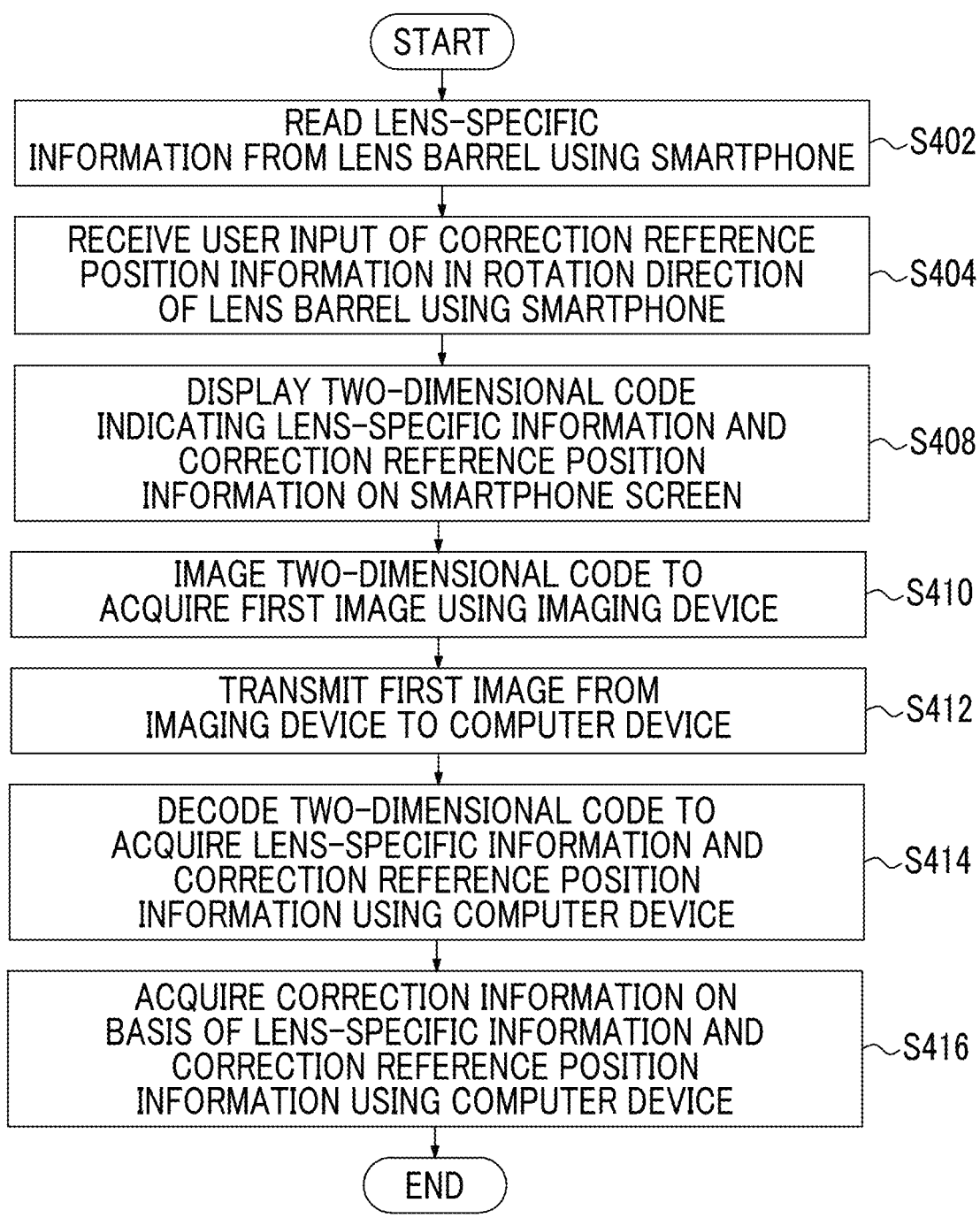
FIG. 17 is a flowchart showing a flow of an image processing example in the fourth embodiment.

FIG. 17 is a flowchart showing a flow of an image processing example in the fourth embodiment.

First, the lens-specific information is read from the lens barrel 24 by the smartphone 30 (step S402). Step S402 is the same as step S102 of the first embodiment.

Figure 18:
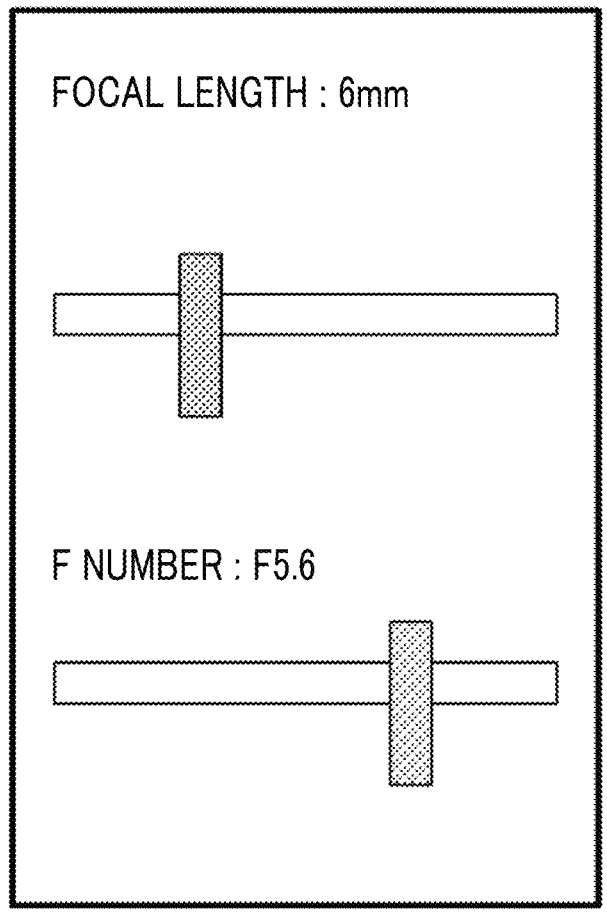
FIG. 18 is an illustrative diagram illustrating a user input example.

Then, the user input of the correction reference position in the rotation direction of the lens barrel 24 is received by the manipulation unit 34 of the smartphone 30 (step S404). As illustrated in FIG. 18, input of information (a focal length and an F number in this example) other than the correction reference position may be received.

Steps S408 to S416 are the same as steps S308 to S316 in the third embodiment, and description thereof is omitted.

However, the correction information acquisition unit 66 of this example acquires the correction information on the basis of the user input information received by the smartphone 30.

In the embodiment, it is not necessary for new hardware and new software for transmitting the lens-specific information and the correction reference position information to be added to the transmission path Rc (which is an image transmission path depending on a manufacturer of the imaging device) from the imaging device 10 to the driver 52 of the computer device 40, as in the third embodiment. That is, it is possible to easily correct image deterioration caused by nonuniform optical characteristics around the optical axis of the lens according to the position in the rotational direction of the lens barrel.

Although the case where the lens-specific information and the correction reference position information are coded into the two-dimensional code has been described by way of example in the third embodiment and the fourth embodiment, the information may be coded into another signal. The other coding is not limited to spatial coding, but temporal coding (for example, a signal coded with blinking such as Morse code) may be used.

Fifth Embodiment

Figure 19:
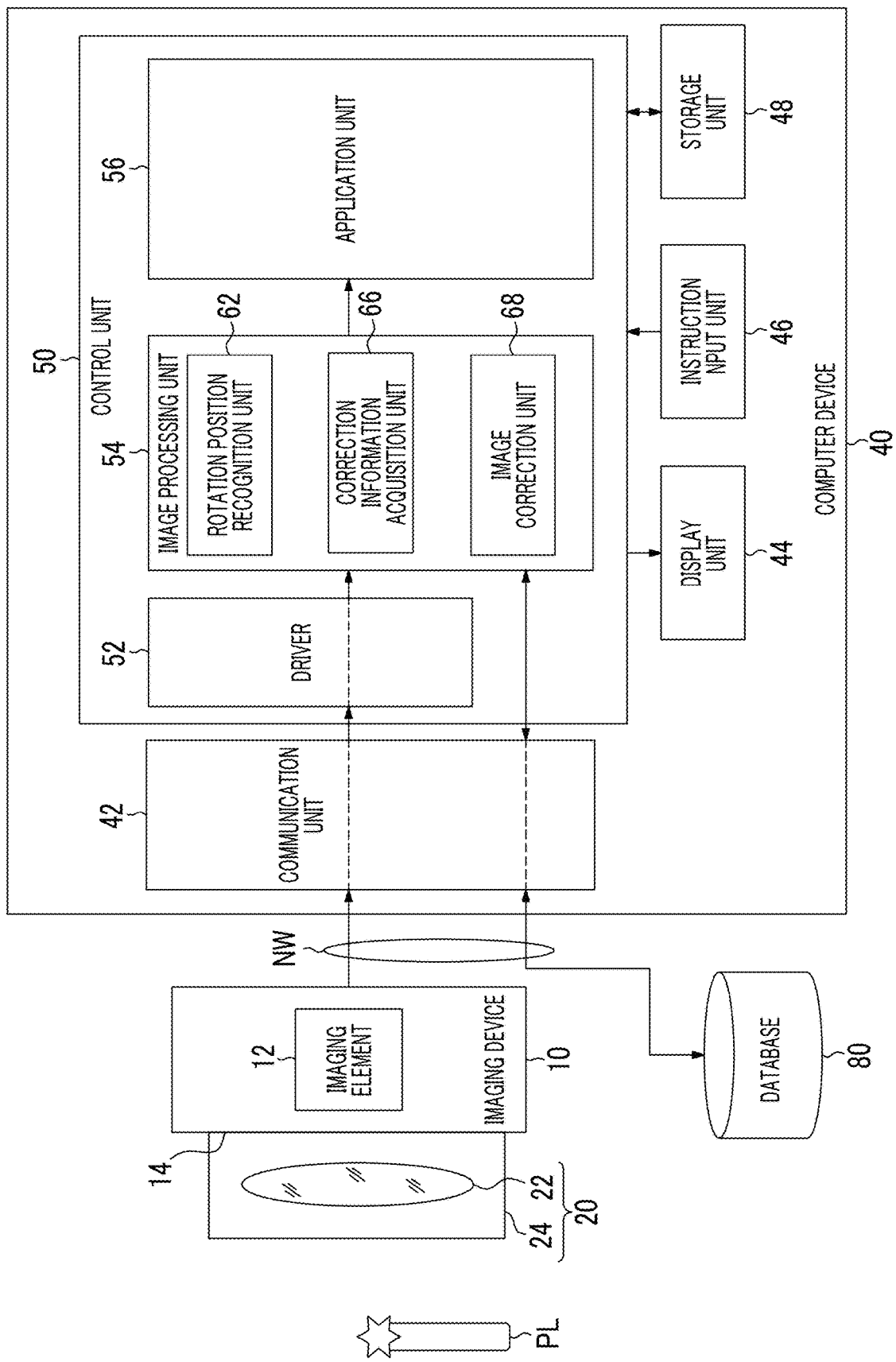
FIG. 19 is a block diagram illustrating a configuration example of an image processing system including an image processing device according to a fifth embodiment.

FIG. 19 is a block diagram illustrating a configuration example of an image processing system including an image processing device according to a fifth embodiment. In FIG. 19, the same components as those of the image processing device in the first embodiment illustrated in FIG. 1 are denoted with the same reference numerals, and content that has already described are hereinafter omitted.

In the embodiment, the correction reference position of the lens barrel 24 is indicated by light emission of a pen light PL. The rotation position recognition unit 62 detects a light intensity distribution within the screen of the first image and recognizes the correction reference position on the basis of the light intensity distribution.

Figure 20:
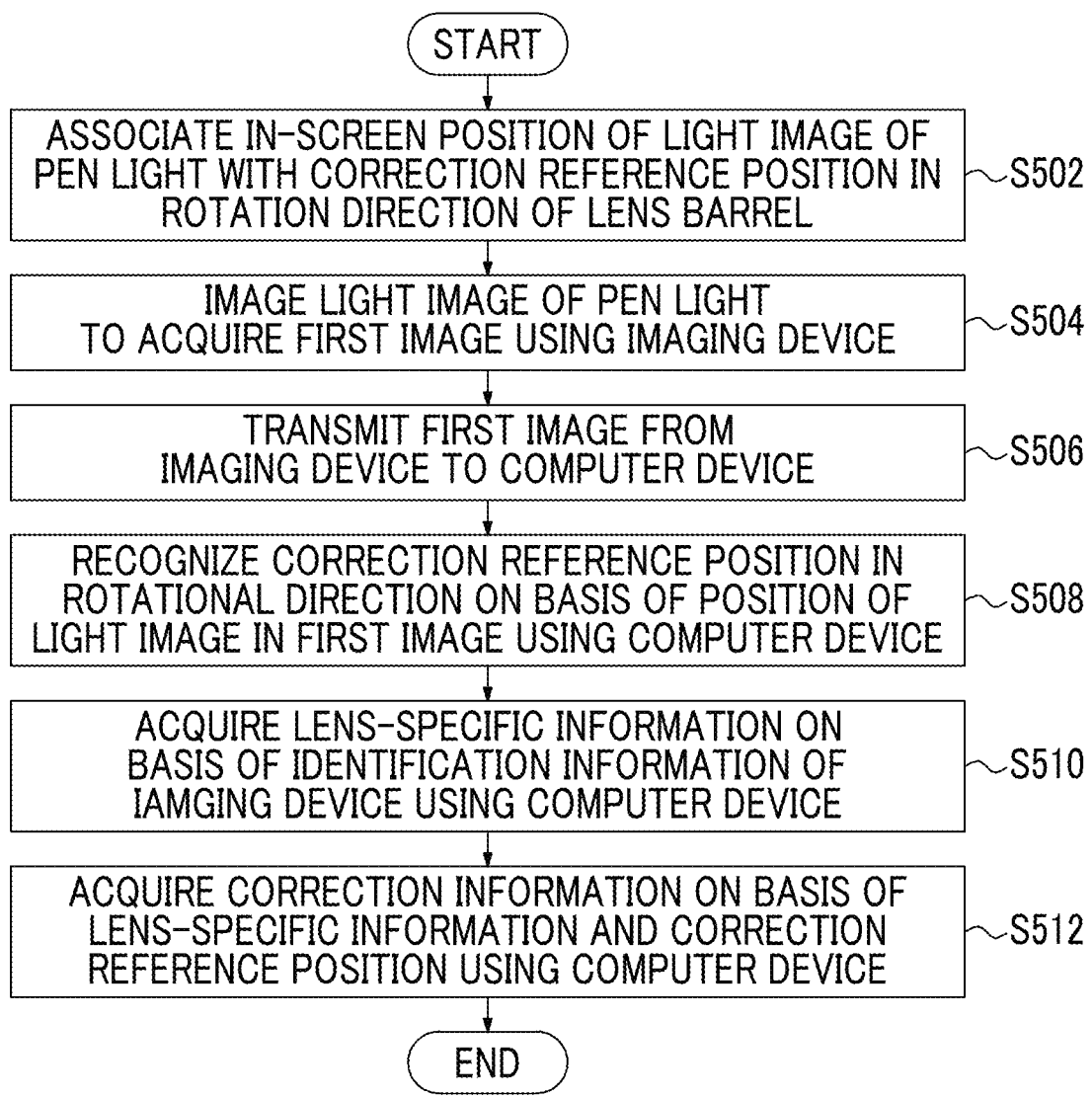
FIG. 20 is a flowchart showing a flow of an image processing example in the fifth embodiment.

FIG. 20 is a flowchart showing a flow of an image processing example in the fifth embodiment.

Figure 21:
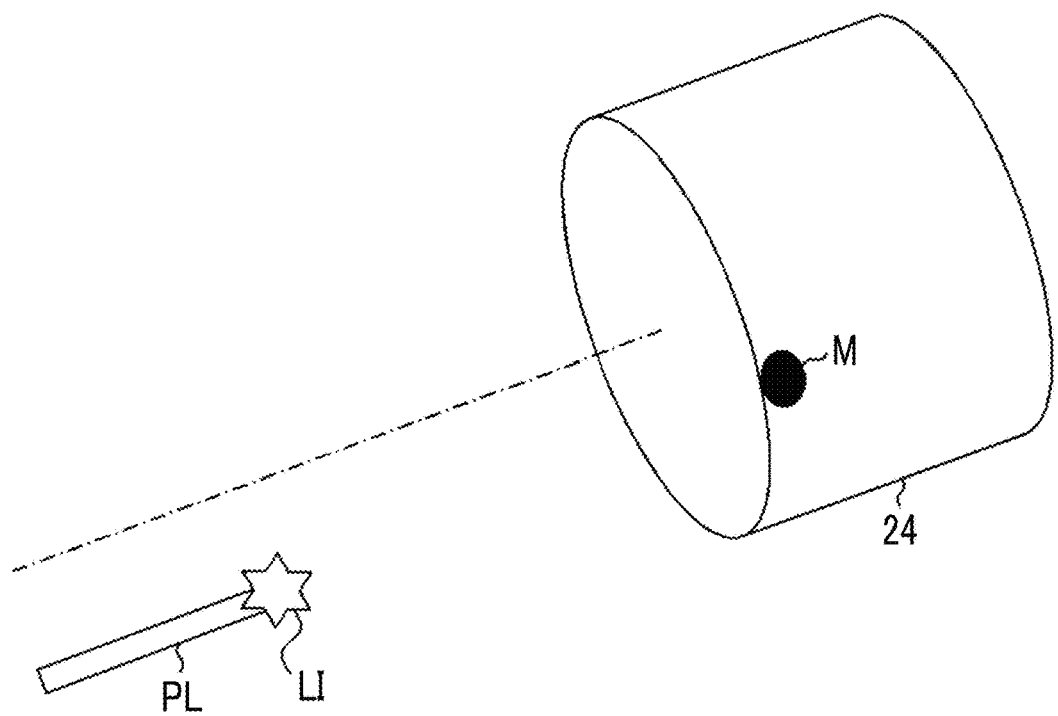
FIG. 21 is an illustrative diagram that is used to illustrate an example in which a tip of a pen light is associated with a correction reference position in the fifth embodiment.

First, an in-screen position of a light image of the pen light PL (a light emitter) is associated with the correction reference position in the rotation direction of the lens barrel 24 (step S502). That is, as illustrated in FIG. 21, a tip of the pen light PL is associated with a position of the mark M of the lens barrel 24. The pen light PL may blink.

Figure 22:
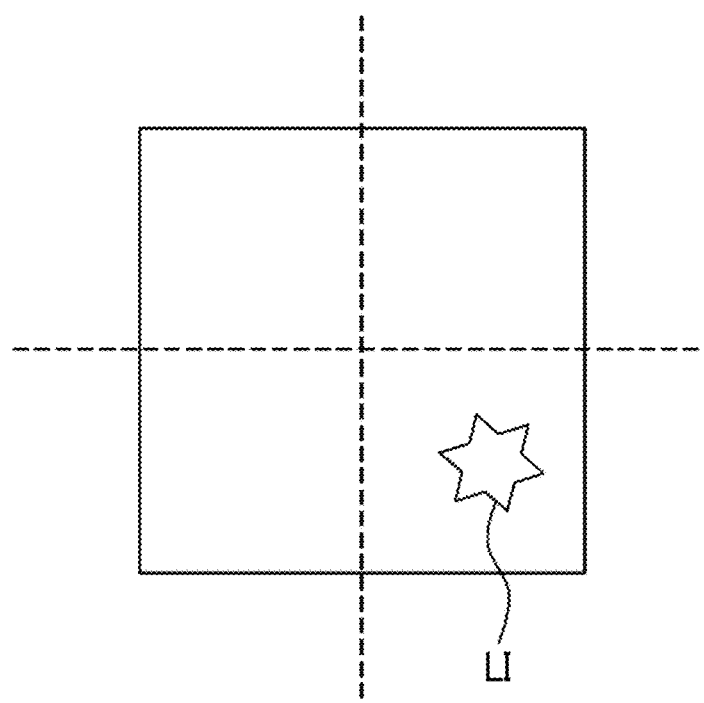
FIG. 22 is an illustrative diagram illustrating an example of a first image in the fifth embodiment.

Then, the light image of the pen light PL is captured by the imaging device 10 and the first image is acquired (step S504). That is, as illustrated in FIG. 22, a first image including the light image LI of the light emitted from the pen light PL is acquired.

Then, the first image including the light image of the pen light PL is transmitted from the imaging device 10 to the computer device 40 (step S506). The first image is input by the communication unit 42 of the computer device 40.

Then, the rotation position recognition unit 62 of the computer device 40 recognizes the correction reference position of the rotational direction of the lens barrel 24 on the basis of the position of the light image of the pen light PL within the screen of the first image (step S508). In a case where the pen light PL blinks, the correction reference position in the rotation direction of the lens barrel 24 is recognized on the basis of the temporal change in the light intensity in the first image.

Then, the correction information acquisition unit 66 of the computer device 40 acquires the lens-specific information on the basis of the identification information of the imaging device 10 (step S510).

Then, the correction information acquisition unit 66 of the computer device 40 acquires the correction information from the database 80 on the basis of the lens-specific information and the correction reference position in the rotation direction of the lens barrel 24 (step S512).

Figure 23:
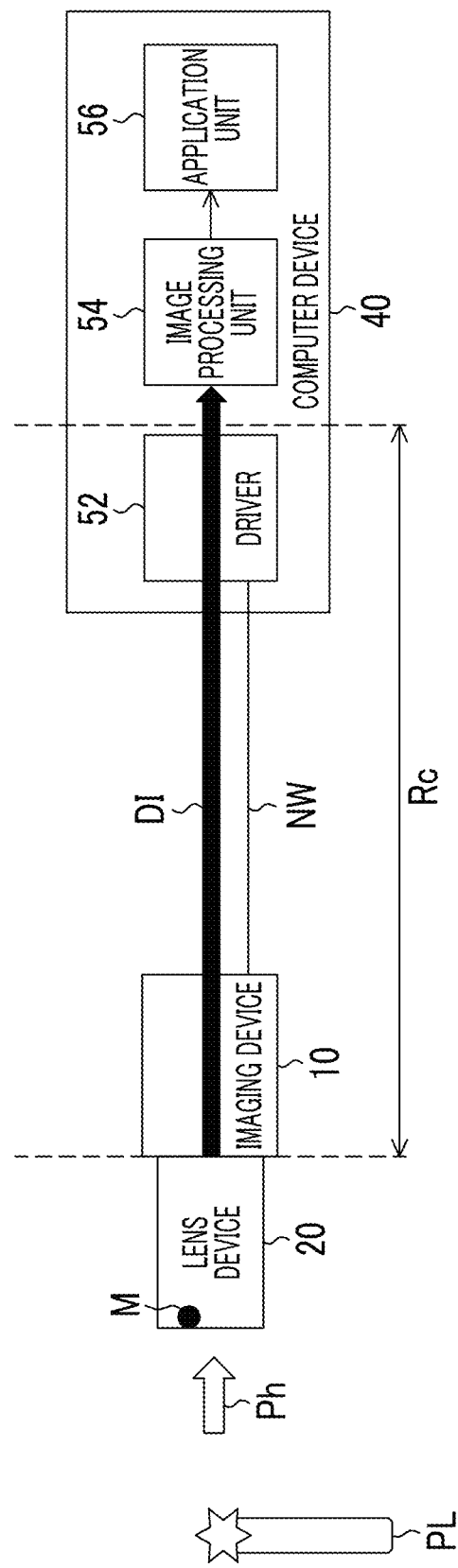
FIG. 23 is an illustrative diagram that is used to illustrate effects in the fifth embodiment.

As illustrated in FIG. 23, in the embodiment, a first image DI including the light image LI (point light source image) of the pen light PL that shows the correction reference position of the lens barrel 24 at the position on the screen is acquired by normal imaging Ph of the imaging device 10 and delivered to the image processing unit 54 of the computer device 40 by normal processing of the driver 52 of the computer device 40. The image processing unit 54 of the computer device 40 recognizes the correction reference position from the position in a screen of the light image LI in the first image DI. Thus, it is not necessary for new hardware and new software for transmitting the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

Sixth Embodiment

Figure 24:
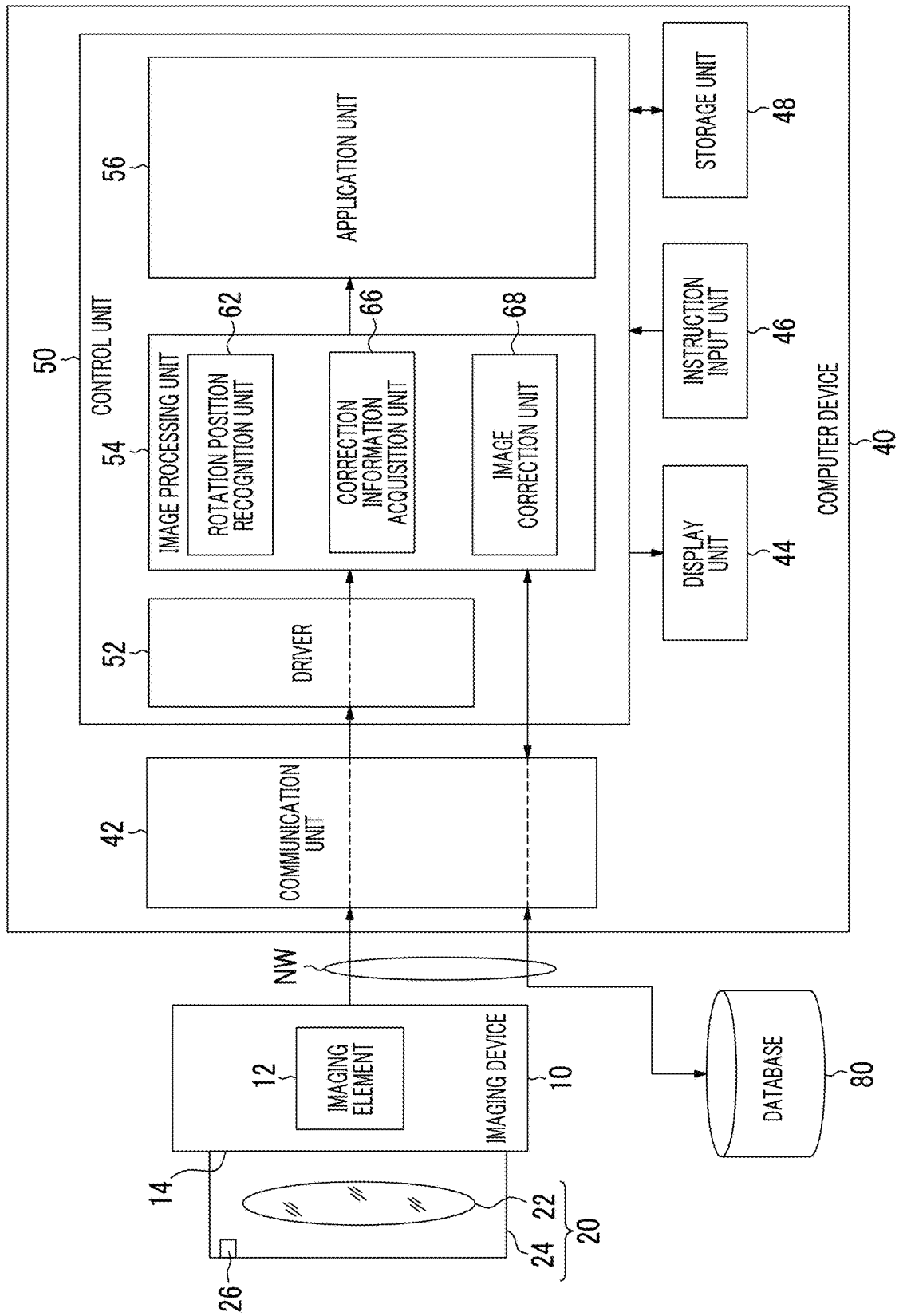
FIG. 24 is a block diagram illustrating a configuration example of an image processing system including an image processing device according to a sixth embodiment.

FIG. 24 is a block diagram illustrating a configuration example of an image processing system including an image processing device according to a sixth embodiment. In FIG. 24, the same components as those of the image processing device in the first embodiment illustrated in FIG. 1 are denoted with the same reference numerals, and content that has already described are hereinafter omitted.

The lens device 20 includes a point light source 26 on an inner circumference of the lens barrel 24. The point light source 26 may be provided on an outer circumference of the lens barrel 24. The point light source 26 of the lens device 20 is configured of, for example, a light emitting diode (LED). The rotation position recognition unit 62 detects the light intensity distribution within the screen of the first image and recognizes the correction reference position on the basis of the light intensity distribution.

Figure 25:
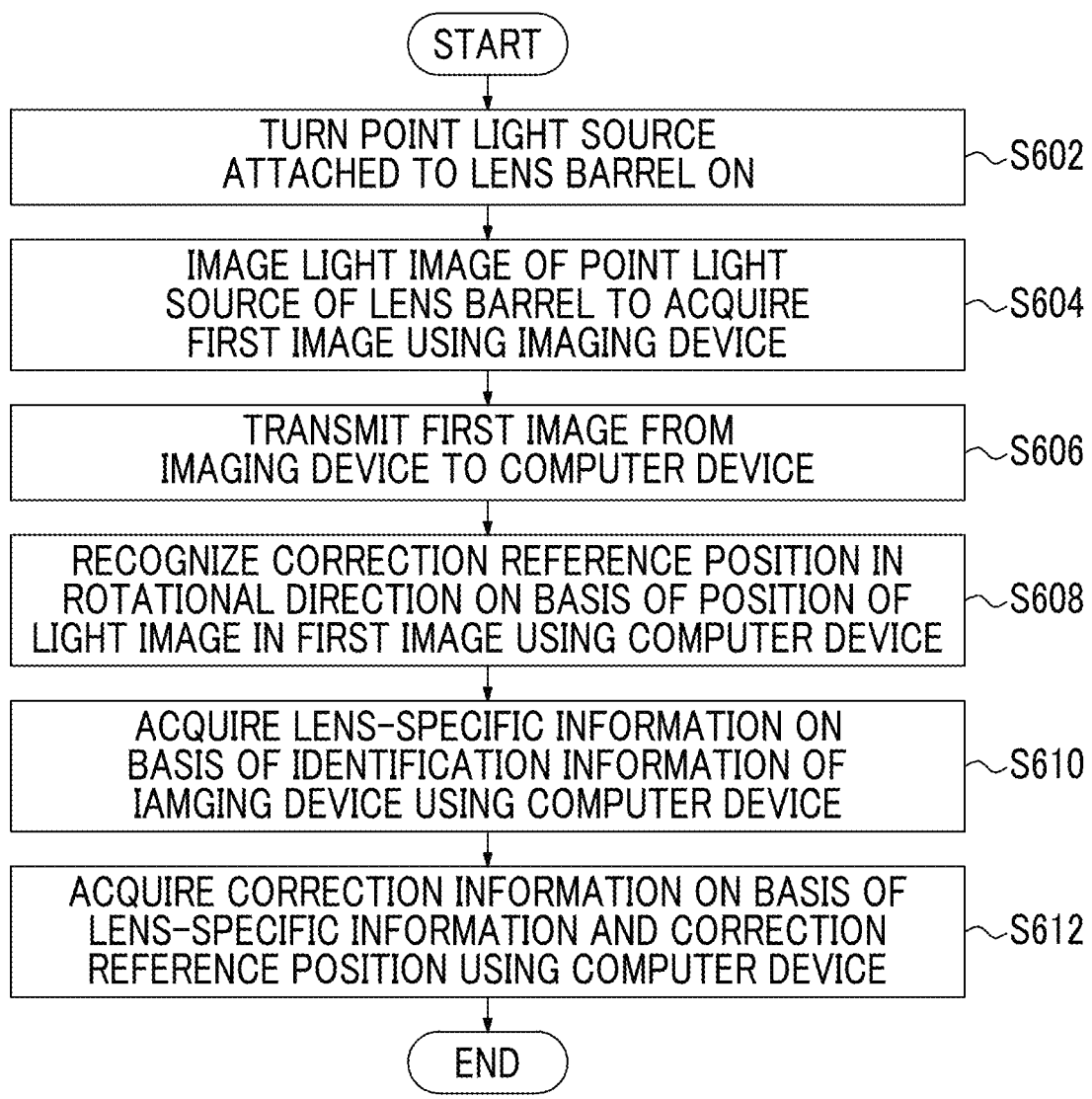
FIG. 25 is a flowchart showing a flow of an image processing example in the sixth embodiment.

FIG. 25 is a flowchart showing a flow of an image processing example according to the fifth embodiment.

Figure 26:
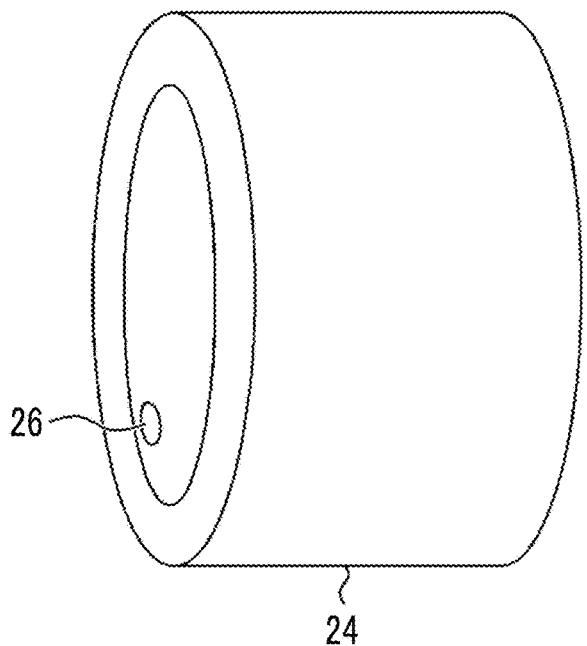
FIG. 26 is an illustrative diagram that is used to illustrate an example of a point light source of a lens barrel according to a sixth embodiment.

First, as illustrated in FIG. 26, the point light source 26 attached to the lens barrel 24 is turned on (step S602). For example, a switch (not illustrated) that instructs turn-on of the point light source 26 is provided in the lens barrel 24, and the switch is turned on. The point light source 26 in this example corresponds to the mark M in FIG. 2 and indicates the correction reference position of the lens barrel 24. The point light source 26 may blink.

Figure 27:
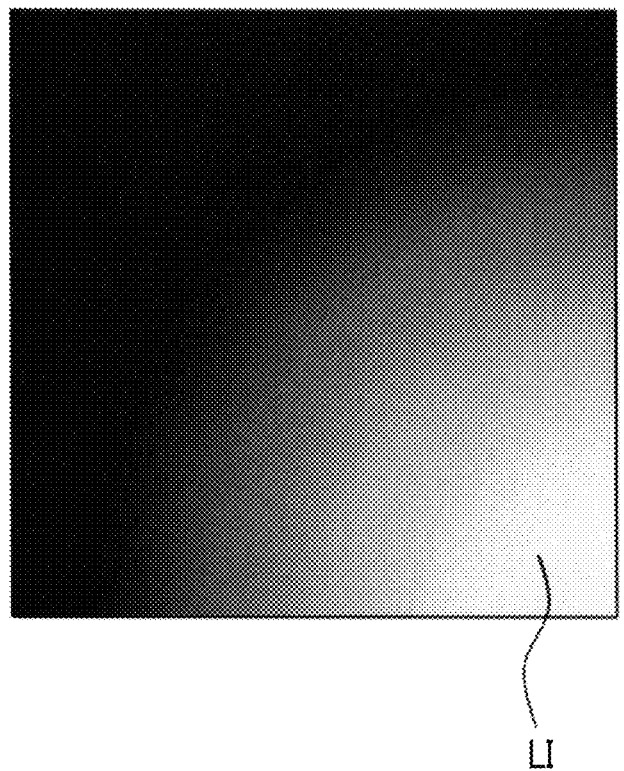
FIG. 27 is an illustrative diagram illustrating an example of a first image in the sixth embodiment.

Then, the light image of the lens barrel 24 is captured by the imaging device 10 and the first image is acquired (step S604). That is, as illustrated in FIG. 27, a first image including the light image LI of the light emitted from the point light source 26 of the lens barrel 24 is acquired.

Then, the first image including the light image of the point light source 26 of the lens barrel 24 is transmitted from the imaging device 10 to the computer device 40 (step S606). The first image is input by the communication unit 42 of the computer device 40.

Then, the rotation position recognition unit 62 of the computer device 40 recognizes the correction reference position in the rotational direction of the lens barrel 24 on the basis of the position of the light image of the point light source 26 of the lens barrel 24 within the screen of the first image (step S608). In a case where the point light source 26 blinks, the correction reference position in the rotation direction of the lens barrel 24 is recognized on the basis of the temporal change in the light intensity in the first image.

Steps S610 and S620 are the same as steps S510 and S512 in the fifth embodiment, and description thereof will be omitted.

Figure 28:
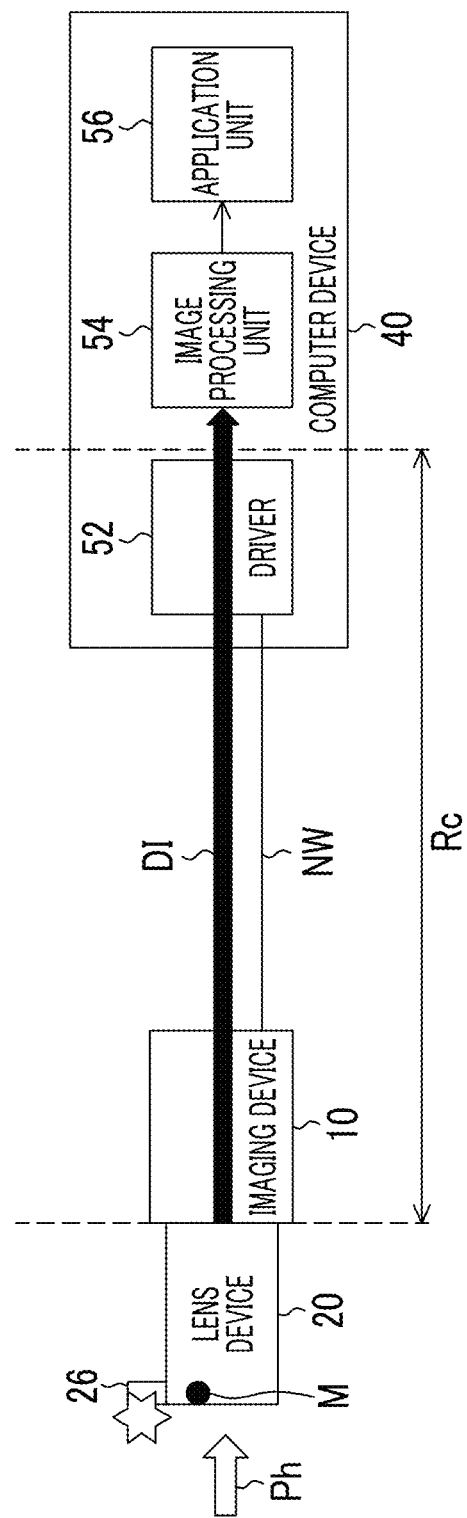
FIG. 28 is an illustrative diagram that is used to illustrate effects in the sixth embodiment.

As illustrated in FIG. 28, in the embodiment, a first image DI including the light image LI (point light source image) of the point light source 26 that shows the correction reference position of the lens barrel 24 at the position on the screen is acquired by normal imaging Ph of the imaging device 10 and delivered to the image processing unit 54 of the computer device 40 by normal processing of the driver 52 of the computer device 40. The image processing unit 54 of the computer device 40 recognizes the correction reference position from the position on the screen of the light image LI in the first image DI. Thus, it is not necessary for new hardware and new software for transmitting the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

Seventh Embodiment

Figure 29:
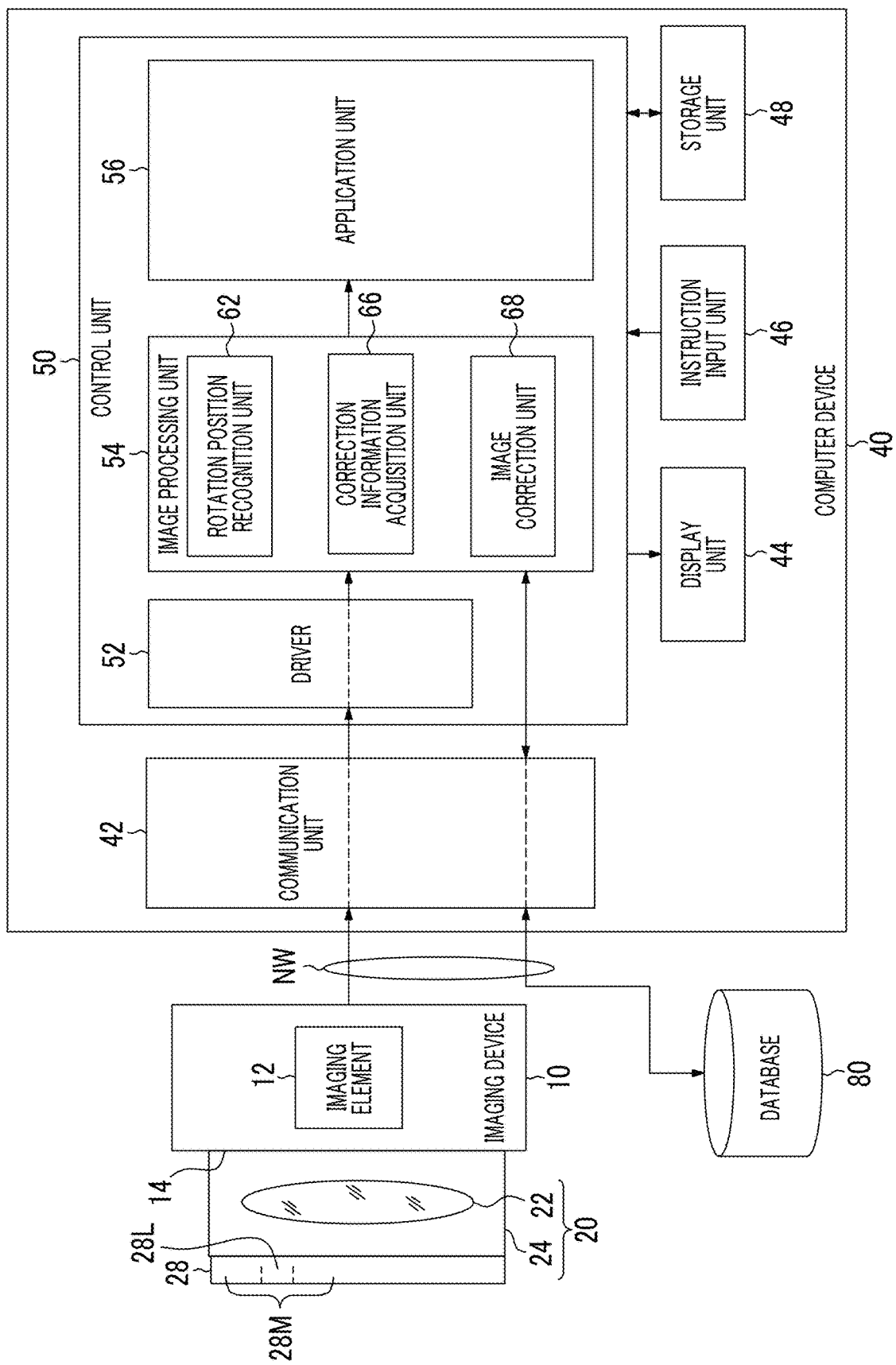
FIG. 29 is a block diagram illustrating a configuration example of an image processing system including an image processing device according to a seventh embodiment.

FIG. 29 is a block diagram illustrating a configuration example of an image processing system including an image processing device according to a seventh embodiment. In FIG. 29, the same components as those of the image processing device in the first embodiment illustrated in FIG. 1 are denoted with the same reference numerals, and content that has already described are hereinafter omitted.

Figure 30:
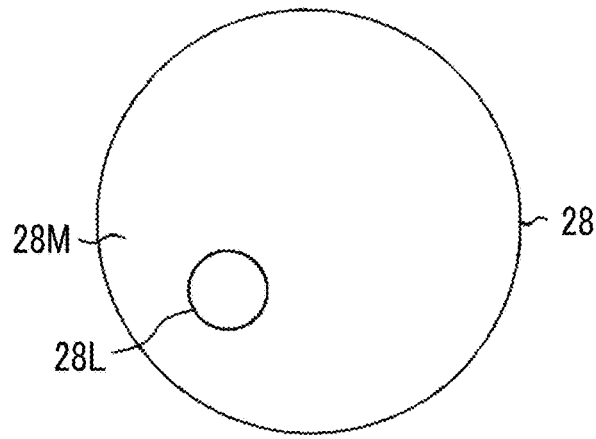
FIG. 30 is a diagram illustrating an example of a cap in the seventh embodiment.

A cap 28 is attached to a tip of the lens barrel 24. As illustrated in FIG. 30, the cap 28 has a light transmission portion 28L including an opening portion that passes external light, and a light shielding portion 28M that shields the external light as compared with the light transmission portion 28L. That is, the light intensity distribution in the first image is generated using a light intensity difference between the light transmission region and the light shielding region in the first image. The rotation position recognition unit 62 recognizes the correction reference position by detecting at least one of the light transmission region or the light-shielding region within the screen of the first image.

Figure 31:
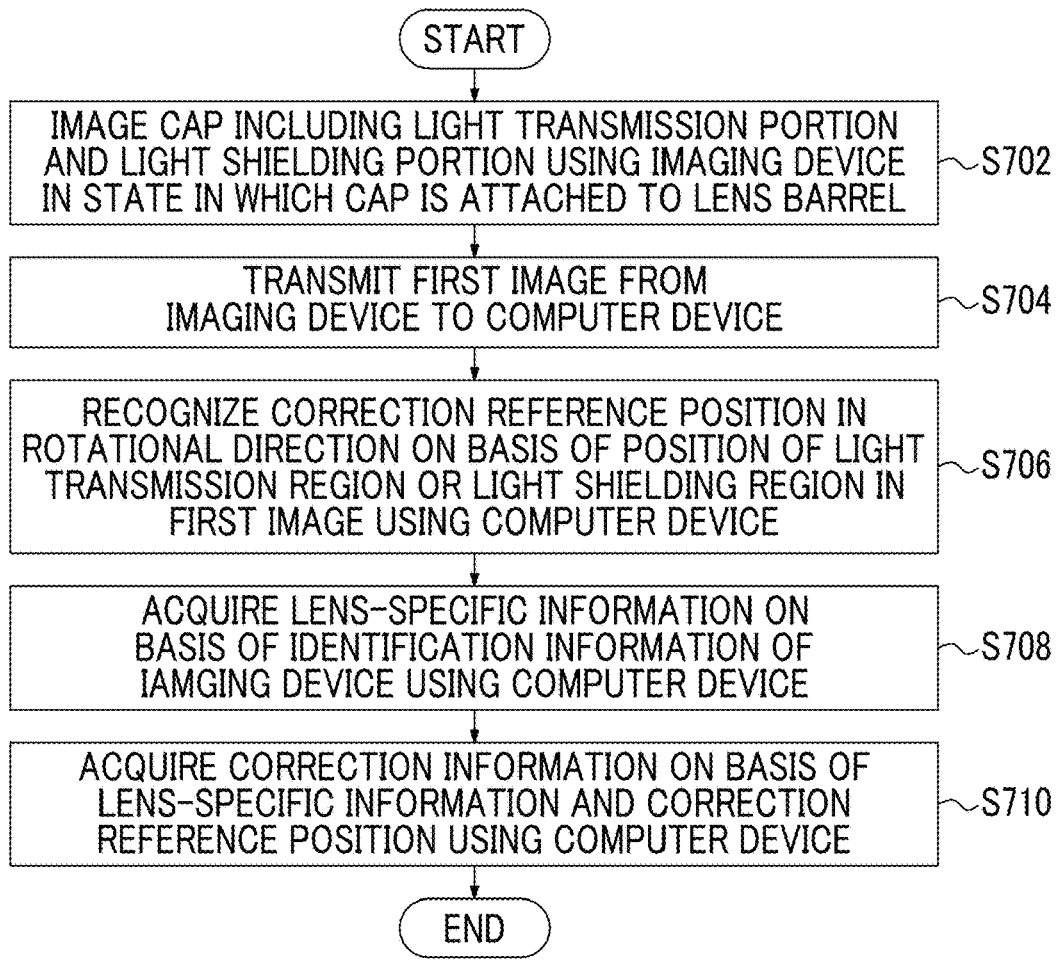
FIG. 31 is a flowchart showing a flow of an image processing example in the seventh embodiment.

FIG. 31 is a flowchart showing a flow of an image processing example in the seventh embodiment.

Figure 32:
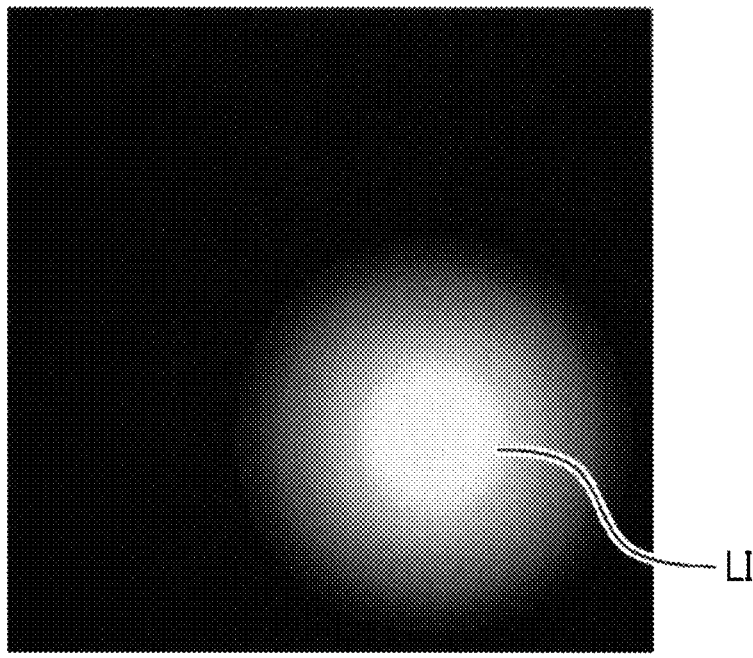
FIG. 32 is an illustrative diagram illustrating an example of a first image in the seventh embodiment.

First, in a state in which the cap 28 including the light transmission portion 28L (light transmission region) and the light shielding portion 28M (light shielding region) is attached to the lens barrel 24, imaging is performed by the imaging device 10 to acquire the first image (step S702). That is, as illustrated in FIG. 32, a first image including the light image LI corresponding to the light transmission portion 28L of the cap 28 is acquired. The position of the light transmission portion 28L of the cap 28 in the rotation direction of the lens barrel 24 is associated with the position of the mark M in the rotation direction of the lens barrel 24. Therefore, the position of the light image LI in the first image corresponds to the position of the mark M in the lens barrel 24.

Then, the first image including the light image of the point light source 26 of the lens barrel 24 is transmitted from the imaging device 10 to the computer device 40 (step S704). The first image is input by the communication unit 42 of the computer device 40.

Then, the rotation position recognition unit 62 of the computer device 40 recognizes the correction reference position in the rotational direction of the lens barrel 24 on the basis of the position of the light image LI (light transmission region) within the screen of the first image (step S706). The correction reference position may be recognized on the basis of the position of the light shielding region within the screen of the first image.

Steps S708 and S710 are the same as steps S510 and S512 in the fifth embodiment, and description thereof will be omitted.

Figure 33:
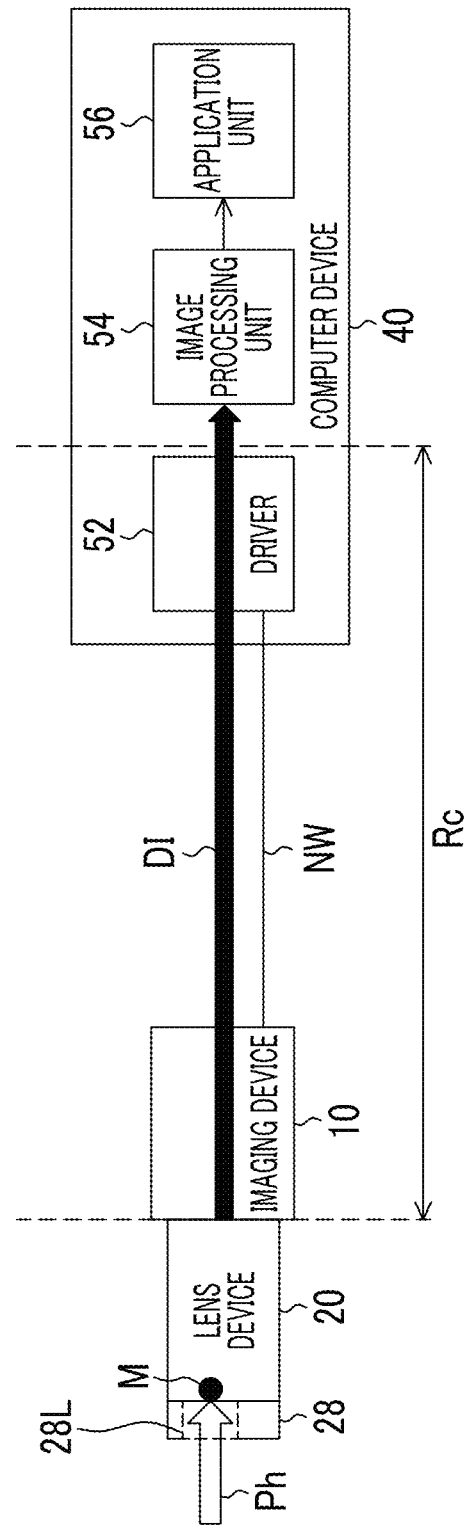
FIG. 33 is an illustrative diagram that is used to illustrate effects in the seventh embodiment.

As illustrated in FIG. 33, in the embodiment, a first image DI including the light image LI of the cap 28 that shows the correction reference position of the lens barrel 24 at the position on the screen is acquired by normal imaging Ph of the imaging device 10 and delivered to the image processing unit 54 of the computer device 40 by normal processing of the driver 52 of the computer device 40. The image processing unit 54 of the computer device 40 recognizes the correction reference position from the position in the screen of the light image LI in the first image DI. Thus, it is not necessary for new hardware and new software for transmitting the correction reference position information to be added to the transmission path Rc (which is an image transmission path depending on a manufacturer of the imaging device) from the imaging device 10 to the driver 52 of the computer device 40. That is, it is possible to easily correct image deterioration caused by nonuniform optical characteristics around the optical axis of the lens according to the position in the rotational direction of the lens barrel.

[Configuration Example of Smartphone]

Figure 34:
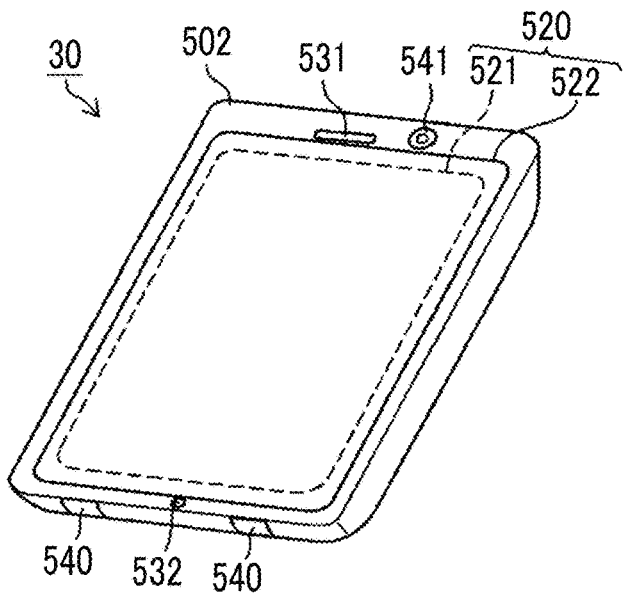
FIG. 34 is an external view of an example of a smartphone.

FIG. 34 illustrates an external appearance of the smartphone 30 which is an example of the image display device. The smartphone 30 illustrated in FIG. 34 includes a flat casing 502, and includes a display input unit 520 in which a display panel 521 as a display unit on one surface of the casing 502, and a manipulation panel 522 as an input unit are formed integrally. Further, the casing 502 includes a speaker 531, a microphone 532, a manipulation unit 540, and a camera unit 541. It should be noted that the configuration of the casing 502 is not limited thereto, and for example, a configuration in which the display unit and the input unit are independent can be adopted, or a structure having a folding structure or a sliding mechanism can be adopted.

Figure 35:
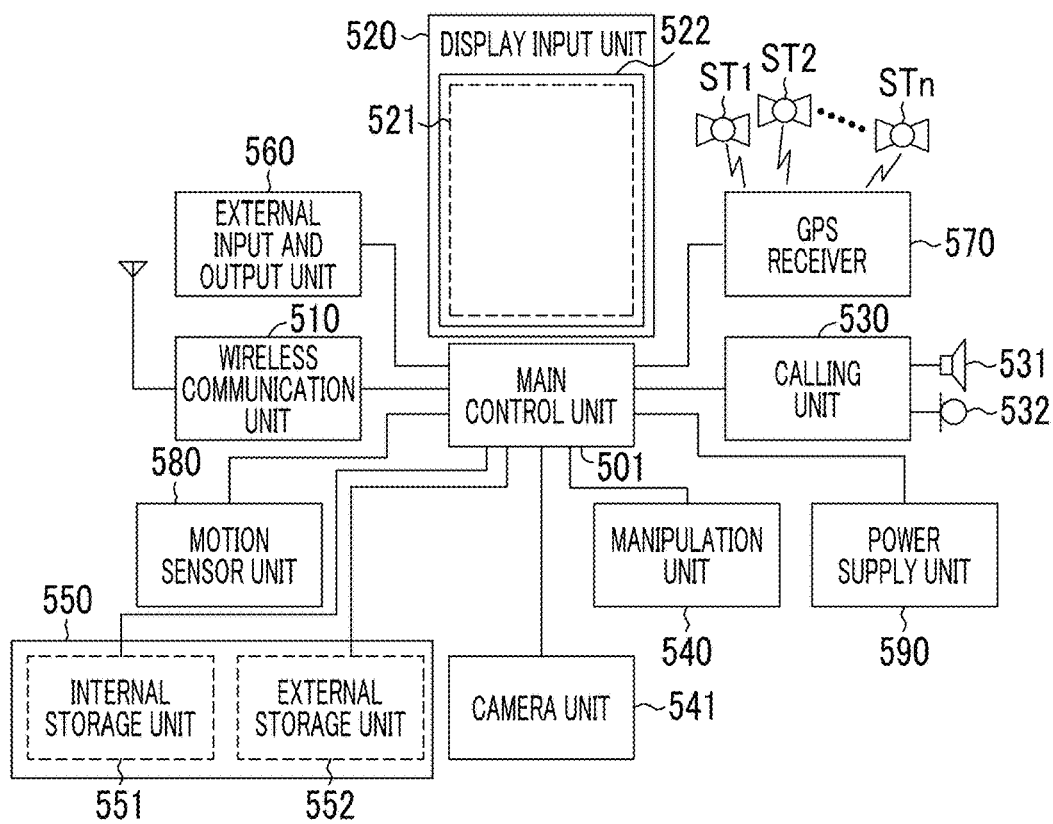
FIG. 35 is a block diagram illustrating a configuration example of a smartphone.

FIG. 35 is a block diagram illustrating a configuration of the smartphone 30 illustrated in FIG. 34. As illustrated in FIG. 35, main components of the smartphone include a wireless communication unit 510, a display input unit 520, a calling unit 530, a manipulation unit 540, a camera unit 541, a storage unit 550, an external input/output unit 560, a global positioning system (GPS) reception unit 570, a motion sensor unit 580, a power supply unit 590, and a main control unit 501. The main function of the smartphone 30 includes a wireless communication function of performing mobile wireless communication via the base station device BS and the mobile communication network.

The wireless communication unit 510 wirelessly communicates with the base station device BS accommodated in a mobile communication network according to an instruction from the main control unit 501. Using this wireless communication, transmission and reception of various types of file data such as voice data and image data, e-mail data, or the like, or reception of Web data, streaming data, or the like is performed.

Under the control of the main control unit 501, the display input unit 520 is a so-called touch panel that displays images (a still image and a moving image), character information, and the like to visually deliver information to the user and detects a user manipulation with respect to the displayed information, and includes the display panel 521 and the manipulation panel 522. The display input unit 520 corresponds to the manipulation unit 34 of the smartphone 30 illustrated in FIG. 16.

In the display panel 521, a liquid crystal display (LCD), an organic electro-luminescence display (OELD), or the like is used as a display device. The manipulation panel 522 is a device that is placed so that an image displayed on a display surface of the display panel 521 is viewable, and detects one or a plurality of coordinates that are manipulated by a finger of the user or a pen type input device. In a case where this device is manipulated by the finger of the user or the pen type input device, a detection signal generated due to the manipulation is output to the main control unit 501. Then, the main control unit 501 detects a manipulation position (coordinates) on the display panel 521 on the basis of the received detection signal.

As illustrated in FIG. 34, the display panel 521 and the manipulation panel 522 of the smartphone 30 illustrated as an embodiment of the imaging device of the present invention are integrally formed to constitute the display input unit 520, but the manipulation panel 522 is disposed to completely cover the display panel 521. In the case where this disposition is adopted, the manipulation panel 522 may also have a function of detecting a user manipulation in a region outside the display panel 521. In other words, the manipulation panel 522 may include a detection region (hereinafter referred to as a display region) for an overlapping portion overlapping the display panel 521, and a detection region for an outer edge portion not overlapping the display panel 521 (hereinafter referred to as a non-display region) other than the overlapping portion.

Although a size of the display region and a size of the display panel 521 may be perfectly matched with each other, it is not always necessary to match the size of the display region with the size of the display panel 521. In addition, the manipulation panel 522 may include two sensitive regions including an outer edge portion and an inner portion other than the outer edge portion. Further, a width of the outer edge portion is appropriately designed according to the size of the casing 502, or the like. Furthermore, examples of a position detection scheme that is employed in the manipulation panel 522 may include a matrix switch scheme, a resistive film scheme, a surface acoustic wave scheme, an infrared scheme, an electromagnetic induction scheme, and a capacitance scheme, and any scheme can also be adopted.

The calling unit 530 includes a speaker 531 or a microphone 532, converts a voice of the user input through the microphone 532 into voice data that can be processed by the main control unit 501 and outputs the voice data to the main control unit 501, or decodes voice data received by the wireless communication unit 510 or the external input/output unit 560 and outputs the decoded voice data from the speaker 531. Further, as illustrated in FIG. 34, for example, the speaker 531 can be mounted on the same surface as the surface on which the display input unit 520 is provided, and the microphone 532 can be mounted on a side surface of the casing 502.

The manipulation unit 540 is a hardware key using a key switch or the like, and receives an instruction from the user. For example, as illustrated in FIG. 34, the manipulation unit 540 is a push button type switch that is mounted on a side surface of the casing 502 of the smartphone 30, is turned on in a case where the manipulation unit 540 is pressed by a finger or the like, and is turned off due to a restoring force of a spring or the like in a case where the finger is released.

The storage unit 550 stores a control program or control data of the main control unit 501, application software, address data associated with a name, a telephone number, or the like of a communication partner, data of a transmitted or received e-mail, Web data downloaded by Web browsing, or downloaded content data, and temporarily stores streaming data or the like. Further, the storage unit 550 includes an internal storage unit 551 built in the smartphone, and an external storage unit 552 having an external detachable memory slot. Each of the internal storage unit 551 and the external storage unit 552 constituting the storage unit 550 may be realized using a storage medium such as a flash memory type, a hard disk type, a multimedia card micro type, a card type memory (for example, a MicroSD (registered trademark) memory), a random access memory (RAM), or a read only memory (ROM).

The external input/output unit 560 plays a role of an interface with all external devices connected to the smartphone 30, and may be directly or indirectly connected to the other external devices, for example, through communication (for example, universal serial bus (USB)) or a network (for example, the Internet, wireless local area network (LAN), Bluetooth (registered trademark), radio frequency identification (RFID), infrared data association (IrDA) (registered trademark), ultra wideband (UWB) (registered trademark), or ZigBee (registered trademark).

Examples of external devices connected to the smartphone 30 include a wired/wireless headset, a wired/wireless external charger, a wired/wireless data port, a memory card or a subscriber identity module (SIM) card/user identity module (UIM) card connected to a card socket, an external audio and video device that is connected via an audio and video input/output (I/O) terminal, an external audio and video device that is connected wirelessly, a smartphone that is connected by a cable or wirelessly, a personal computer that is connected by a cable or wirelessly, a personal digital assistant (PDA) that is connected by a cable or wirelessly, and an earphone. The external input/output unit can allow data received from such an external device to be transferred to each of internal components of the smartphone 30 or allow internal data of the smartphone 30 to be transferred to the external device.

According to an instruction from the main control unit 501, the GPS reception unit 570 receives GPS signals that are transmitted from GPS satellites ST1 to STn, executes a positioning calculation process on the basis of a received plurality of GPS signals, and detects a position including a latitude, a longitude, and an altitude of the smartphone 30. In a case where the GPS reception unit 570 can acquire position information from the wireless communication unit 510 or the external input/output unit 560 (for example, a wireless LAN), the GPS reception unit 570 can also detect the position using the position information.

The motion sensor unit 580 includes, for example, a three-axis acceleration sensor, and detects a physical movement of the smartphone 30 according to an instruction from the main control unit 501. By detecting the physical movement of the smartphone 30, a moving direction or an acceleration of the smartphone 30 is detected. This detection result is output to the main control unit 501.

The motion sensor unit 580 of this example can be used as the posture sensor 32 of FIG. 13.

The power supply unit 590 supplies power stored in a battery (not illustrated) to each unit of the smartphone 30 according to an instruction from the main control unit 501.

The main control unit 501 includes a microprocessor, operates according to a control program or control data stored in the storage unit 550, and controls all the respective units of the smartphone 30. Further, the main control unit 501 has a mobile communication control function of controlling each unit of the communication system and an application processing function to perform voice communication or data communication through the wireless communication unit 510.

The application processing function is realized by the main control unit 501 operating according to application software stored in the storage unit 550. Examples of the application processing function include an infrared communication function of controlling the external input/output unit 560 to perform data communication with an opposite device, an e-mail function of performing transmission and reception of an e-mail, and a web browsing function of browsing a web page.

Further, the main control unit 501 has an image processing function such as a display of an image on the display input unit 520 on the basis of image data (data of a still image or a moving image) such as received data or downloaded streaming data. The image processing function refers to a function of the main control unit 501 decoding the image data, performing image processing on a decoding result, and displaying the image on the display input unit 520.

Further, the main control unit 501 executes display control with respect to the display panel 521 and manipulation detection control for detecting user manipulation through the manipulation unit 540 and the manipulation panel 522.

Through execution of the display control, the main control unit 501 displays an icon for activating the application software or a software key such as a scroll bar or displays a window for creating an e-mail. It should be noted that the scroll bar is a software key for receiving an instruction to move a display unit of the image with respect to a large image or the like which cannot fit in a display region of the display panel 521.

In addition, through execution of a manipulation detection control, the main control unit 501 detects a user manipulation through the manipulation unit 540, receives a manipulation on the icon and an input of a character string to an input field of the window through the manipulation panel 522, or receives a scroll request of the display image through the scroll bar.

Further, by executing the manipulation detection control, the main control unit 501 has a touch panel control function of determining whether a manipulation position with respect to the manipulation panel 522 is an overlapping portion (a display region) overlapping the display panel 521 or an outer edge portion (a non-display region) not overlapping the display panel 521 other than the overlapping portion, and controlling a sensitive region of the manipulation panel 522 or a display position of the software key.

Further, the main control unit 501 can detect a gesture manipulation with respect to the manipulation panel 522 and execute a preset function according to the detected gesture manipulation. The gesture manipulation is not a simple touch manipulation of the related art, but means a manipulation for drawing a trajectory using a finger or the like, designating a plurality of positions at the same time, or combining these to draw the trajectory with respect to at least one from the plurality of positions.

The camera unit 541 is a digital camera that performs electronic imaging using an imaging element such as a complementary metal oxide semiconductor (CMOS) imaging sensor or a charge coupled device (CCD) imaging sensor. In addition, under the control of the main control unit 501, the camera unit 541 converts the image data obtained by imaging into, for example, compressed image data such as joint photographic coding experts group (JPEG) image data and records the image data in the storage unit 550 or outputs the image data to the external input/output unit 560 or the wireless communication unit 510. In the smartphone 30 illustrated in FIG. 35, the camera unit 541 is mounted on the same surface as the display input unit 520, but a mounting position of the camera unit 541 is not limited thereto, and the camera unit 541 may be mounted on a back surface of the display input unit 520 or a plurality of camera units 541 may be mounted. It should be noted that, in a case where the plurality of camera units 541 are mounted, switching can be performed among the camera units 541 to be used for imaging and the camera unit 541 can performing imaging alone, or imaging can be performed using the plurality of camera units 541 at the same time.

In addition, the camera unit 541 can be used for various functions of the smartphone 30. For example, it is possible to display the image acquired by the camera unit 541 on the display panel 521, and to use the image of the camera unit 541 as one of manipulation inputs of the manipulation panel 522. Further, in a case where the GPS reception unit 570 detects the position, it is also possible to detect the position by referring to the image from the camera unit 541. Further, it is possible to determine the optical axis direction of the camera unit 541 of the smartphone 30 without using a triaxial acceleration sensor or in combination with the triaxial acceleration sensor by referring to the image from the camera unit 541 or to determine a current usage environment. Of course, it is also possible to use the image from the camera unit 541 in the application software.

In addition, the position information acquired by the GPS reception unit 570, voice information acquired by the microphone 532 (which may be text information by performing voice-text conversion in a main control unit or the like), posture information acquired by the motion sensor unit 580, or the like can be added to image data of a still image or a moving image and recorded in the storage unit 550, or can be output via the external input/output unit 560 or the wireless communication unit 510.

Although the embodiments for carrying out the present invention have been described above, the present invention is not limited to the embodiments and modification examples described above, and various modifications can be performed without departing from the gist of the present invention.

EXPLANATION OF REFERENCES

- 10: imaging device
- 12: imaging element
- 14: mount unit
- 20: lens device
- 22: lens
- 24: lens barrel
- 26: point light source
- 28: cap
- 28L: light transmission portion
- 28M: light shielding portion
- 30: smartphone
- 32: posture sensor
- 34: manipulation unit
- 40: computer device
- 42: communication unit
- 44: display unit
- 46: instruction input unit
- 48: storage unit
- 50: control unit
- 52: driver
- 54: image processing unit
- 56: application unit
- 62: rotation position recognition unit
- 64: decoding unit
- 66: correction information acquisition unit
- 68: image correction unit
- 80: database
- 501: main control unit
- 502: casing
- 510: wireless communication unit
- 520: display input unit
- 521: display panel
- 522: manipulation panel
- 530: calling unit
- 531: speaker
- 532: microphone
- 540: manipulation unit
- 541: camera unit
- 550: storage unit
- 551: internal storage unit
- 552: external storage unit
- 560: external input/output unit
- 570: GPS reception unit
- 580: motion sensor unit
- 590: power supply unit
- BS: base station device
- Cd: two-dimensional code
- DI: first image
- LI: light image
- M: mark
- MP: marker
- NW: network
- P0: inspection reference position
- PL: pen light
- Pc: correction reference position
- Ph: imaging
- R: rotational direction
- Rc: transmission path
- ST: GPS satellite

What is claimed is:

1. An image processing device, comprising:
   an image input unit that inputs a first image indicating a correction reference position in a rotation direction of a lens barrel mounted on an imaging device and a second image that is a correction target, the first image and the second image being obtained by imaging of the imaging device;
   a rotation position recognition unit that recognizes the correction reference position in the rotational direction on the basis of the first image;
   a correction information acquisition unit that acquires correction information corresponding to nonuniform optical characteristics around an optical axis of a lens held in the lens barrel on the basis of the correction reference position in the rotation direction; and
   an image correction unit that corrects the second image on the basis of the correction information.

2. The image processing device according to claim 1,
   wherein the first image includes a marker indicating the correction reference position, and
   the rotation position recognition unit measures a slope of the marker within a screen of the first image and recognizes the correction reference position on the basis of the slope.

3. The image processing device according to claim 2,
   wherein the marker is a one-dimensional or two-dimensional barcode.

4. The image processing device according to claim 3,
   wherein the barcode includes at least one of the correction information or the identification information, and
   the correction information acquisition unit acquires the correction information according to the correction reference position on the basis of a decoding result of the barcode and a slope of the barcode within the screen of the first image.

5. The image processing device according to claim 2, wherein the marker is a marker displayed on an image display device or a marker printed on an object.

6. The image processing device according to claim 1,
wherein the first image includes correction reference position information acquired by the image display device, and
the rotation position recognition unit recognizes the correction reference position by extracting the correction reference position information from the first image.

7. The image processing device according to claim 6,
wherein the correction reference position information is posture information indicating a posture of the image display device detected by the image display device, and
the correction information acquisition unit acquires the correction information on the basis of the posture information.

8. The image processing device according to claim 6,
wherein the correction reference position information is user input information received by the image display device, and
the correction information acquisition unit acquires the correction information on the basis of the user input information.

9. The image processing device according to claim 1,
wherein the first image includes a light image due to light emission of a light source, and
the rotation position recognition unit detects a light intensity distribution within the screen of the first image and recognizes the correction reference position on the basis of the light intensity distribution.

10. The image processing device according to claim 9, wherein the rotation position recognition unit recognizes the correction reference position on the basis of the position of the light image within the screen of the first image.

11. The image processing device according to claim 9,
wherein the light source is a point light source, and
the rotation position recognition unit recognizes the correction reference position in the rotational direction on the basis of the position of the light image of the point light source in the first image.

12. The image processing device according to claim 9,
wherein the light intensity distribution is caused by a light intensity difference between a light transmission region and a light shielding region in the first image, and
the rotation position recognition unit recognizes the correction reference position by detecting at least one of the light transmission region or the light-shielding region in the first image.

13. The image processing device according to claim 9, wherein the rotation position recognition unit recognizes the correction reference position in the rotational direction on the basis of a temporal change in a light intensity in the first image.

14. The image processing device according to claim 1, wherein the correction information acquisition unit acquires the correction information according to another correction reference position by converting correction information according to a single correction reference position.

15. The image processing device according to claim 1, wherein the correction information acquisition unit selects the correction information according to the correction reference position recognized by the rotation position recognition unit from a plurality of pieces of the correction information.

16. The image processing device according to claim 1, wherein the correction information includes correction information for a point image restoration process.

17. An image processing system comprising: a lens device including the lens and the lens barrel; the imaging device; and the image processing device according to claim 1.

18. An image processing method, comprising processes of:
inputting a first image indicating a correction reference position in a rotation direction of a lens barrel mounted on an imaging device and a second image that is a correction target, the first image and the second image being obtained by imaging of the imaging device;
recognizing the correction reference position in the rotational direction on the basis of the first image;
acquiring correction information corresponding to non-uniform optical characteristics around an optical axis of a lens held in the lens barrel on the basis of the correction reference position in the rotation direction; and
correcting the second image on the basis of the correction information.

* * * * *